US012673428B2

(12) United States Patent
Ando

(10) Patent No.: US 12,673,428 B2
(45) Date of Patent: Jul. 7, 2026

(54) DEVICE FOR TEACHING POSITION AND POSTURE FOR ROBOT TO GRASP WORKPIECE, ROBOT SYSTEM, AND METHOD

(71) Applicant: Fanuc Corporation, Yamanashi (JP)

(72) Inventor: Toshiyuki Ando, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 68 days.

(21) Appl. No.: 18/294,752

(22) PCT Filed: Aug. 20, 2021

(86) PCT No.: PCT/JP2021/030660
§ 371 (c)(1),
(2) Date: Feb. 2, 2024

(87) PCT Pub. No.: WO2023/021703
PCT Pub. Date: Feb. 23, 2023

(65) Prior Publication Data
US 2024/0342919 A1 Oct. 17, 2024

(51) Int. Cl.
*B25J 9/16* (2006.01)
*B25J 19/02* (2006.01)
(52) U.S. Cl.
CPC ........... *B25J 9/1697* (2013.01); *B25J 9/1669* (2013.01); *B25J 19/023* (2013.01); *G05B 2219/39536* (2013.01)
(58) Field of Classification Search
CPC ...... B25J 9/1697; B25J 9/1669; B25J 19/023; G05B 2219/39536; G05B 2219/39546; G05B 19/42
See application file for complete search history.

(56) References Cited

U.S. PATENT DOCUMENTS 9,868,215 B2 1/2018 Suzuki
12,070,847 B1 * 8/2024 Ebrahimi Afrouzi ....................... B25J 9/1684

(Continued)

FOREIGN PATENT DOCUMENTS

JP 5588089 B1 9/2014
JP 2016209979 A 12/2016

(Continued)

OTHER PUBLICATIONS

International Search Report and Written Opinion for International Application No. PCT/JP2021/030660, dated Nov. 16, 2021, 6 pages.

*Primary Examiner* — Sohana Tanju Khayer
(74) *Attorney, Agent, or Firm* — BUCHANAN INGERSOLL & ROONEY PC

(57) ABSTRACT

A device includes: an image data acquisition unit that acquires, when a robot is grasping a workpiece by a hand, image data of the workpiece imaged by a visual sensor disposed at a known position on a control coordinate system; a workpiece position acquisition unit that acquires workpiece position data indicating a position and a posture of the workpiece on the basis of the image data; a hand position acquisition position that acquires hand position data indicating a position and a posture of the hand obtained when the visual sensor has imaged the image data; and a teaching position acquisition unit that acquires, on the basis of the workpiece position data and the hand position data, teaching position data indicating a positional relationship between the hand and the workpiece obtained when the visual sensor has imaged the image data.

10 Claims, 8 Drawing Sheets

(56) References Cited

U.S. PATENT DOCUMENTS

| | | | |
|---|---|---|---|
| 2003/0200042 A1* | 10/2003 | Gan | B25J 9/1692 |
| | | | 702/105 |
| 2010/0256818 A1* | 10/2010 | Aoba | B25J 9/1612 |
| | | | 700/275 |
| 2013/0238124 A1* | 9/2013 | Suzuki | B25J 9/16 |
| | | | 700/250 |
| 2014/0229005 A1* | 8/2014 | Suzuki | B25J 9/1692 |
| | | | 700/254 |
| 2014/0343729 A1 | 11/2014 | Fudaba et al. | |
| 2018/0257234 A1* | 9/2018 | Shimazu | B25J 9/1697 |
| 2019/0034727 A1* | 1/2019 | Chihara | G06T 7/74 |
| 2019/0099891 A1* | 4/2019 | Tomioka | B25J 9/1697 |
| 2020/0147787 A1* | 5/2020 | Takahashi | B25J 13/085 |
| 2020/0262064 A1* | 8/2020 | Claussen | B25J 9/1669 |
| 2020/0406466 A1* | 12/2020 | Kitai | B25J 13/08 |
| 2021/0107161 A1* | 4/2021 | Tsukabe | B25J 9/1697 |
| 2022/0016784 A1* | 1/2022 | Tawara | B25J 9/1697 |
| 2022/0241982 A1* | 8/2022 | Oishi | G06T 7/50 |
| 2023/0053168 A1 | 2/2023 | Watanabe et al. | |
| 2023/0390935 A1* | 12/2023 | Nakamura | B25J 13/00 |
| 2023/0405828 A1* | 12/2023 | Tonogai | B25J 9/1692 |
| 2024/0042617 A1* | 2/2024 | Sakurai | B25J 9/1697 |
| 2024/0046401 A1* | 2/2024 | Miyakawa | B25J 9/1612 |
| 2024/0100698 A1* | 3/2024 | Hayashi | G06Q 10/063 |
| 2024/0109190 A1* | 4/2024 | Nakamura | B25J 9/163 |
| 2024/0157567 A1* | 5/2024 | Kawai | B25J 9/163 |

FOREIGN PATENT DOCUMENTS

| | | | |
|---|---|---|---|
| JP | 6326765 B2 | 5/2018 | |
| WO | 2021145311 A1 | 7/2021 | |

* cited by examiner

DEVICE FOR TEACHING POSITION AND POSTURE FOR ROBOT TO GRASP WORKPIECE, ROBOT SYSTEM, AND METHOD

CROSS REFERENCE TO RELATED APPLICATIONS

This is the U.S. National Phase application of PCT/JP2021/030660, filed Aug. 20, 2021, the disclosure of this application being incorporated herein by reference in its entirety.

FIELD OF THE INVENTION

The present disclosure relates to a device, a robot system, and a method of teaching the position and orientation at which a robot grips a workpiece.

BACKGROUND OF THE INVENTION

A known robot system performs an operation to cause a robot to grip a workpiece with a hand, based on image data imaged by a vision sensor (e.g., PTL 1).

PATENT LITERATURE

PTL 1: JP 2016-209979 A

SUMMARY OF THE INVENTION

In the related art, there is a demand for a technique that enables to teach a robot a position with high accuracy at which a hand grips a workpiece.

In one aspect of the present disclosure, a device that teaches a position and orientation at which a robot grips a workpiece with a hand in a control coordinate system for controlling the robot includes: an image data acquisition unit that acquires image data of the workpiece imaged by a vision sensor arranged at a known position in the control coordinate system when the robot grips the workpiece with the hand; a workpiece position acquisition unit that acquires workpiece position data, which indicates a position and orientation of the workpiece in the control coordinate system when the vision sensor images the image data, based on the image data; a hand position acquisition unit that acquires hand position data, which indicates a position and orientation of the hand in the control coordinate system when the vision sensor images the image data; and a teaching position acquisition unit that acquires teaching position data, which indicates a positional relationship between the hand and the workpiece in the control coordinate system when the vision sensor images the image data, based on the workpiece position data and the hand position data.

In another aspect of the present disclosure, a method of teaching a position and orientation at which a robot grips a workpiece with a hand in a control coordinate system for controlling the robot includes: acquiring, by a processor, image data of the workpiece imaged by a vision sensor arranged at a known position in the control coordinate system when the robot grips the workpiece with the hand; acquiring, by the processor, workpiece position data indicating a position and orientation of the workpiece in the control coordinate system when the vision sensor images the image data, based on the image data; acquiring, by the processor, hand position data indicating a position and orientation of the hand in the control coordinate system, when the vision sensor images the image data; and acquiring, by the processor, teaching position data indicating a positional relationship between the hand and the workpiece in the control coordinate system when the vision sensor images the image data, based on the workpiece position data and the hand position data.

By acquiring teaching position data based on the image data imaged when the operator causes the hand to actually grip the workpiece at the gripping position that the operator wants to teach, the gripping position that the operator wants to teach can be taught to the robot with high accuracy.

DETAILED DESCRIPTION OF EMBODIMENTS OF THE INVENTION

Figure 1:
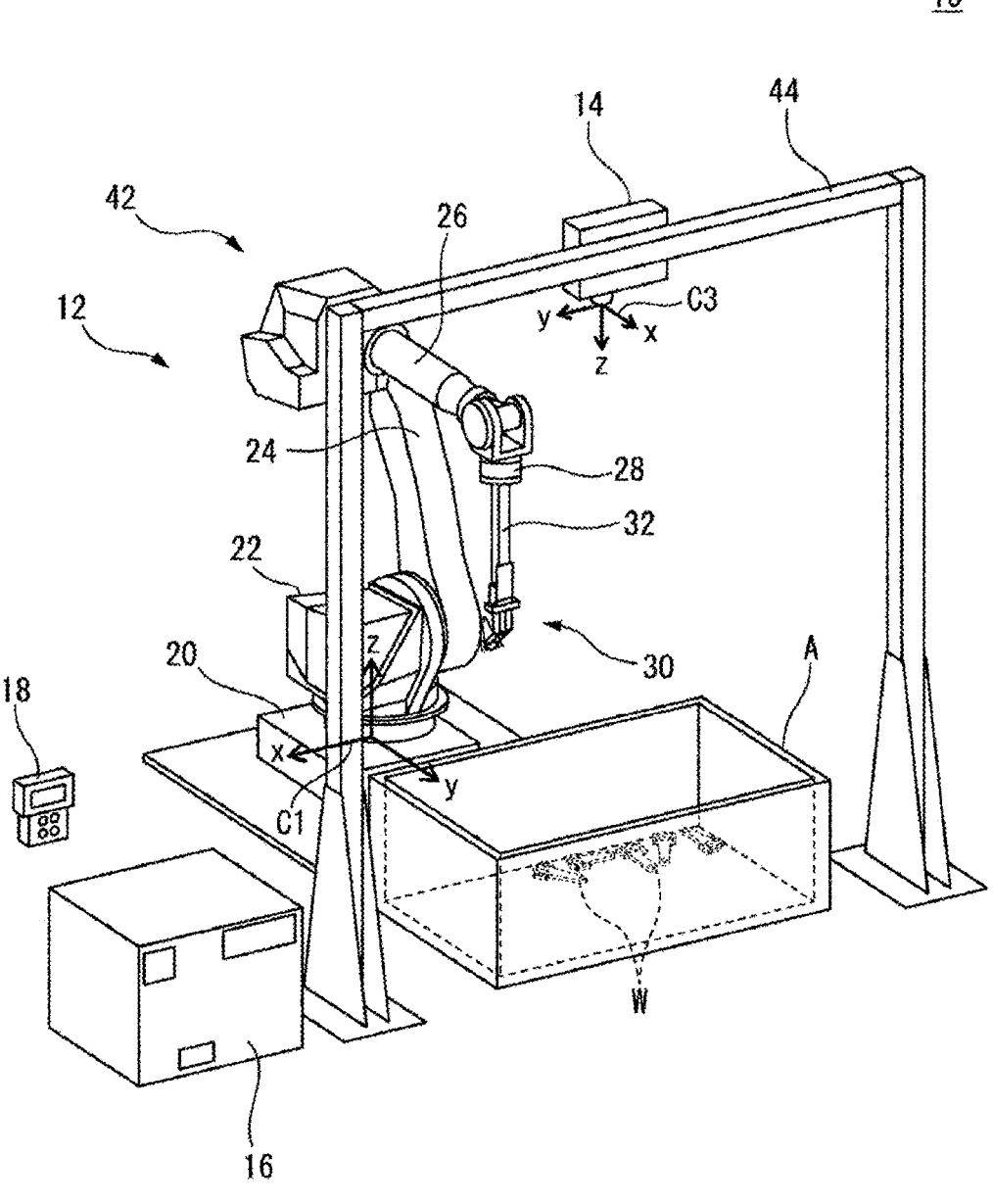
FIG. 1 is a perspective view of a robot system according to an embodiment.

Embodiments of the present disclosure are described in detail below based on the drawings. In the various embodiments described below, the same reference signs are given to the same elements and redundant descriptions are omitted. First, a robot system 10 according to an embodiment will be described with reference to FIGS. 1 and 2. The robot system 10 performs the work of picking up the workpieces W that are stacked in pieces in a container A and is provided with a robot 12, a vision sensor 14, a controller 16, and a teaching device 18.

In the present embodiment, the robot 12 is a vertical articulated robot and includes a robot base 20, a swivel body 22, a lower arm 24, an upper arm 26, a wrist 28, and a hand 30. The robot base 20 is secured on the floor of a work cell. The swivel body 22 is provided on the robot base 20 so as to be rotatable around the vertical shaft. The lower arm 24 is provided at the swivel body 22 so as to be rotatable around the horizontal shaft, and the upper arm 26 is rotatably provided at the tip part of the lower arm 24. The wrist 28 is rotatably provided at the tip part of the upper arm 26.

A plurality of servo motors 40 (FIG. 2) are respectively provided at the robot base 20, the swivel body 22, the lower arm 24, the upper arm 26, and the wrist 28. In response to a command from the controller 16, the servo motor 40 rotates each of the swivel body 22, the lower arm 24, the upper arm 26 and the wrist 28 around the drive shaft, thereby operating the robot 12. In this article, the robot base 20, the swivel body 22, the lower arm 24, the upper arm 26, and the wrist 28 are totally referred to as a mechanical part 42 of the robot 12.

Figure 3:
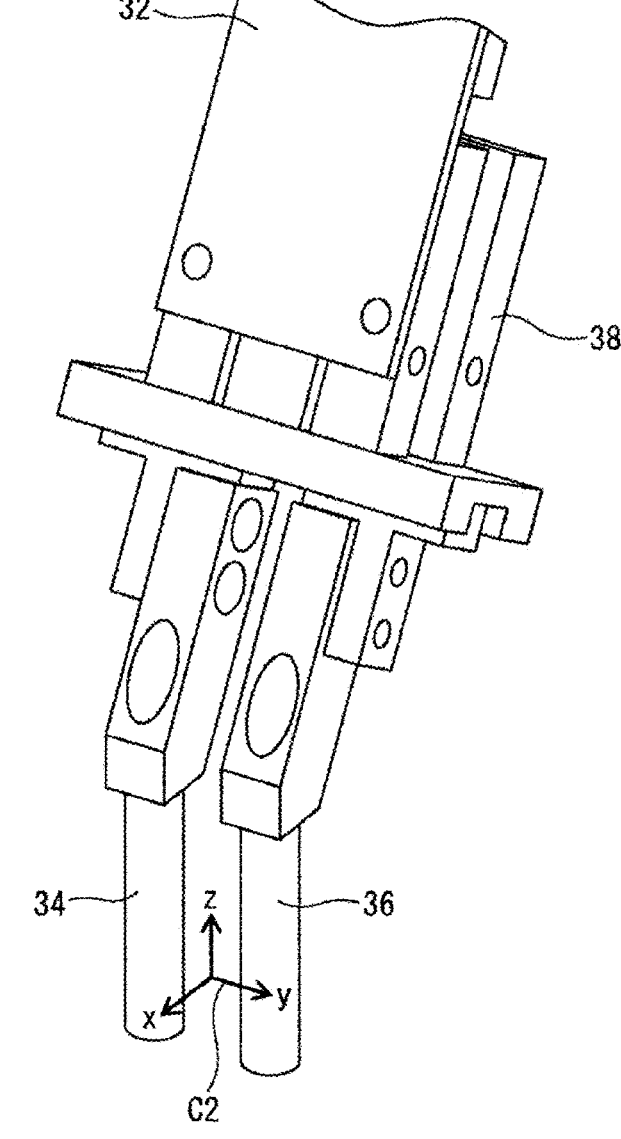
FIG. 3 is an enlarged view of a hand illustrated in FIG. 1.

The hand 30 is removably attached to the tip part (so-called wrist flange) of the wrist 28 and moved by the mechanical part 42 of the robot 12. Specifically, as illustrated in FIG. 3, the hand 30 includes a hand arm 32, claw parts 34 and 36, and a claw part drive part 38. The hand arm 32 is coupled at its base end to the tip part of the wrist 28.

The claw parts 34 and 36 are openably and closably provided at the tip part of the hand arm 32. In the present embodiment, each of the claw parts 34 and 36 is a cylindrical rod member extending in a straight line. The claw part drive part 38 includes, for example, a pneumatic or hydraulic cylinder or a servo motor to open and close the claw parts 34 and 36 in response to commands from the controller 16. The hand 30 can grip and release the workpiece W by opening and closing the claw parts 34 and 36.

Referring again to FIGS. 1 and 2, the vision sensor 14 images the workpiece W. Specifically, the vision sensor 14 is fixed at a retention frame 44. The retention frame 44 is fixed on the floor of the work cell and arranges the vision sensor 14 stationary in a position above the container A.

In the present embodiment, the vision sensor 14 is a three-dimensional vision sensor including an image sensor (CMOS, CCD, or the like) and an optical lens (collimating lens, focusing lens, or the like) that guides the subject image to the image sensor and is configured to image the subject along a visual line direction VL and measure the distance d to the subject image.

The teaching device 18 teaches the robot 12 to grip the workpieces W that are stacked in pieces in the container A with the hand 30. Specifically, the teaching device 18 is a portable computer such as a teaching pendant or a tablet-type terminal device and includes a processor 50, a memory 52, an I/O interface 54, a display device 56, and an input device 58. The processor 50 includes a CPU or a GPU, is communicably connected to the memory 52, the I/O interface 54, the display device 56, and the input device 58 via a bus 60, and performs arithmetic processing to achieve the teaching function described below while communicating with these components.

The memory 52 includes a RAM or a ROM and temporarily or permanently stores various data. The I/O interface 54 includes, for example, an Ethernet (trade name) port, a USB port, an optical fiber connector, or an HDMI (trade name) terminal and communicates data wiredly or wirelessly with an external device under a command from the processor 50.

The display device 56 includes a liquid crystal display or an organic EL display and displays various kinds of data visually under a command from the processor 50. The input device 58 includes a push button, a keyboard, a mouse, or a touch panel and accepts input data from an operator.

The teaching device 18 is configured to send a command to the robot 12 via the controller 16 in response to input data to the input device 58 and to allow the robot 12 to jog in accordance with the command. The display device 56 and the input device 58 may be integrated into the housing of the teaching device 18 or may be externally attached to the housing separately from the housing of the teaching device 18.

The controller 16 controls the operation of the robot 12 and the vision sensor 14. Specifically, the controller 16 is a computer with a processor 70, a memory 72, an I/O interface 74, a display device 76, and an input device 78. The configurations and functions of the processor 70, the memory 72, the I/O interface 74, the display device 76, and the input device 78 are the same as those of the processor 50, the memory 52, the I/O interface 54, the display device 56, and the input device 58, which are described above, so that overlapping descriptions are omitted.

The processor 70 is communicably connected to the memory 72, the I/O interface 74, the display device 76, and the input device 78 via a bus 80 and, while communicating with these components, performs arithmetic processing to achieve the function of operating the robot 12 and the vision sensor 14. The I/O interface 54 of the teaching device 18, the respective servo motors 40 of the robot 12, and the vision sensor 14 are connected to the I/O interface 74, and the processor 70 communicates with these components through the I/O interface 74.

Figure 2:
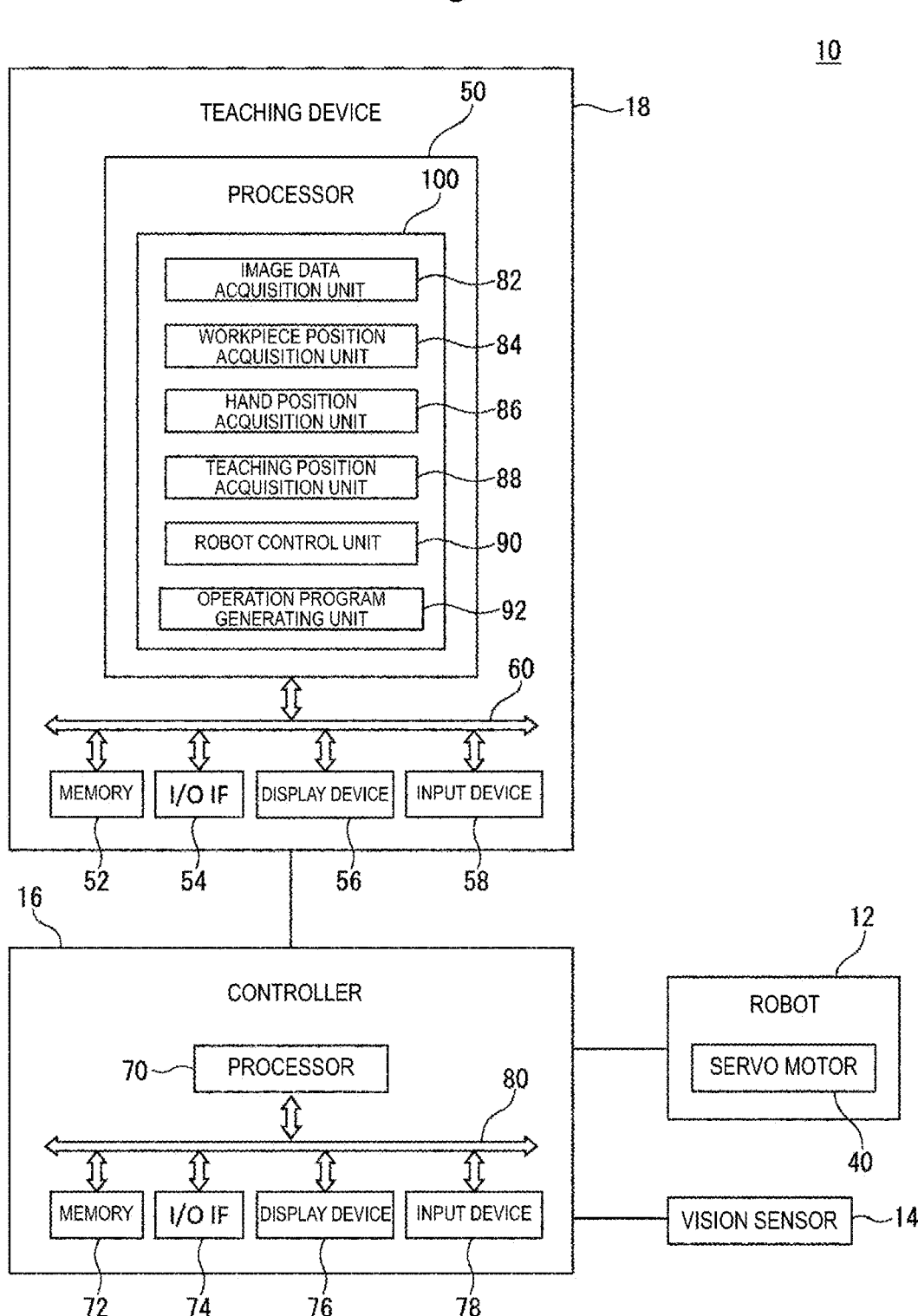
FIG. 2 is a block diagram of the robot system illustrated in FIG. 1.

As illustrated in FIG. 1, a robot coordinate system C1 is set in the mechanical part 42 of the robot 12. The robot coordinate system C1 is a control coordinate system C for automatically controlling the operation of the robot 12 gripping the workpiece W by the hand 30. In the present embodiment, the robot coordinate system C1 is set with respect to the mechanical part 42 such that an origin of the robot coordinate system C1 is located at the center of the robot base 20 and a z-axis of the robot coordinate system C1 coincides with the rotation axis of the swivel body 22.

On the other hand, a tool coordinate system C2 is set at the hand 30 of the robot 12 as illustrated in FIG. 3. The tool coordinate system C2 is the control coordinate system C, which determines the position and orientation of the hand 30 in the robot coordinate system C1. In the present embodiment, the tool coordinate system C2 is set with respect to the hand 30 such that an origin of the tool coordinate system C2 is located at the intermediate position between the claw parts 34 and 36, a y-axis direction of the tool coordinate system C2 is parallel to the opening and closing direction of the claw parts 34 and 36, and a z-axis direction of the tool coordinate system C2 is parallel to the extending direction of each claw part 34 and 36.

The positional relationship between the tool coordinate system C2 and the robot coordinate system C1 is known, and the coordinates of the tool coordinate system C2 and the coordinates of the robot coordinate system C1 can be mutually transformed via a known transformation matrix M1 (e.g., the homogeneous transformation matrix). Thus, the origin position and the direction of each axis of the tool coordinate system C2 in the robot coordinate system C1 are represented as coordinates $(X_{RT}, Y_{RT}, Z_{RT}, W_{RT}, P_{RT}, R_{RT})$ of the robot coordinate system C1. Here, the coordinates $(X_{RT}, Y_{RT}, Z_{RT})$ indicate the origin position of the tool coordinate system C2 in the robot coordinate system C1, and the coordinates $(W_{RT}, P_{RT}, R_{RT})$ indicate the direction (so-called yaw, pitch, roll) of each axis of tool coordinate system C2 in the robot coordinate system C1.

When the hand 30 is positioned at a predetermined position and orientation by the mechanical part 42 of the robot 12, the processor 70 of the controller 16 first sets the tool coordinate system C2 representing the predetermined position and orientation in the robot coordinate system C1. Subsequently, the processor 70 generates a command to each of the servo motors 40 to arrange the hand 30 at the position and orientation determined by the set tool coordinate system C2 and moves the hand 30 by operating the mechanical part 42 in response to the command. Thus, the processor 70 can position the hand 30 at the predetermined position and orientation by the operation of the mechanical part 42 in the robot coordinate system C1.

As illustrated in FIG. 1, a sensor coordinate system C3 is set to the vision sensor 14. The sensor coordinate system C3 is the control coordinate system C that determines the position and orientation (i.e., visual line direction VL) of the vision sensor 14 in the robot coordinate system C1, and also determines the coordinates of each pixel in the image data (or, an image sensor) imaged by the vision sensor 14. In the present embodiment, the sensor coordinate system C3 is set with respect to the vision sensor 14 such that an origin of the sensor coordinate system C3 is located at the center of the image sensor and a z-axis direction of the sensor coordinate system C3 coincides with the visual line direction VL of the vision sensor 14.

Here, in the present embodiment, the vision sensor 14 is disposed at a known position of the robot coordinate system C1 by the retention frame 44. More specifically, the positional relationship between the sensor coordinate system C3 and the robot coordinate system C1 is known by calibration, and the coordinates of the sensor coordinate system C3 and the coordinates of the robot coordinate system C1 can be mutually transformed via a known transformation matrix M2 (e.g., the homogeneous transformation matrix). Thus, the position and orientation (i.e., the origin position and the direction of each axis of the sensor coordinate system C3) of the vision sensor 14 in the robot coordinate system C1 are known.

Figure 4:
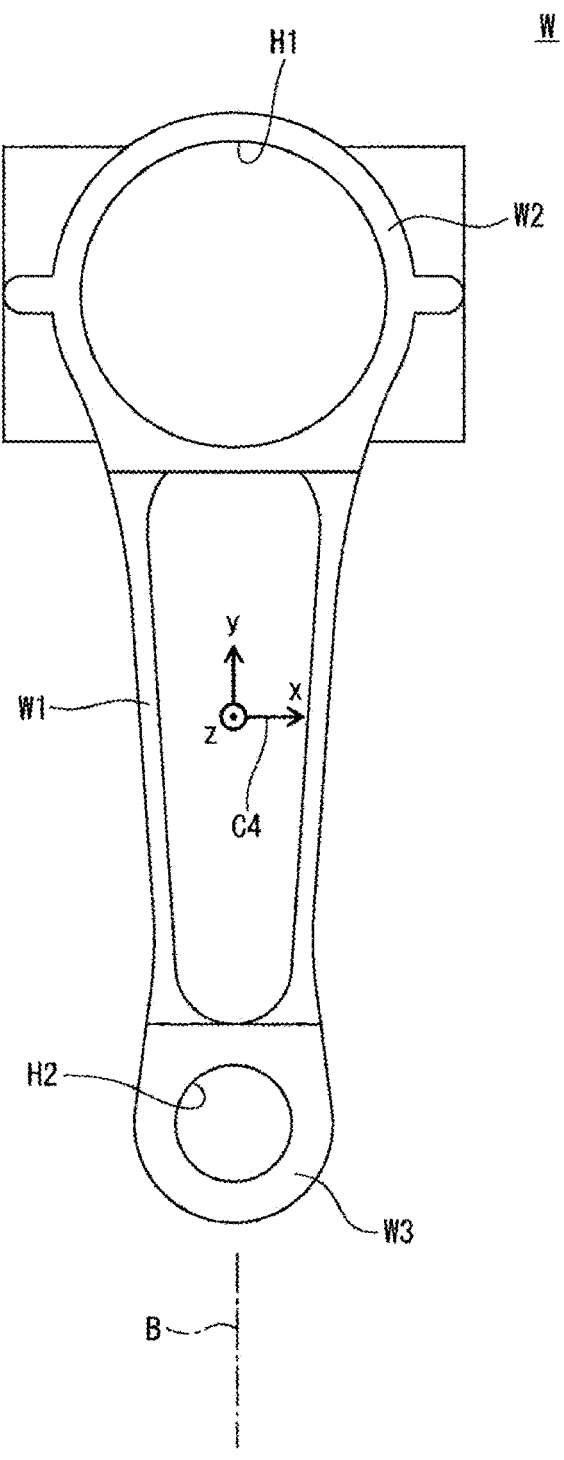
FIG. 4 is a diagram of a workpiece according to an embodiment.

In an actual work line, the processor 70 of the controller 16 images the workpieces W, which are stacked in pieces in the container A, with the vision sensor 14 and, based on imaged image data ID, executes the operation to cause the robot 12 to grip the workpiece W with the hand 30 and pick the workpiece W up from the container A. FIG. 4 illustrates an example of the workpiece W.

In the example illustrated in FIG. 4, the workpiece W is, for example, a connecting rod for an automobile and includes a shaft W1, a large ring W2, and a small ring W3. The shaft W1 extends straight along an axis B. The large ring W2 is fixed to one end of the shaft W1 and has a through hole H1. On the other hand, the small ring W3 is fixed to the other end of the shaft W1 and has a through hole H2.

A workpiece coordinate system C4 is set at the workpiece W to perform the operation of the robot 12 gripping the workpiece W with the hand 30. The workpiece coordinate system C4 is a control coordinate system C that determines the position and orientation of the workpiece W in the robot coordinate system C1. In the present embodiment, the workpiece coordinate system C4 is set with respect to the workpiece W such that an origin of the workpiece coordinate system C4 is located at the center of the shaft W1, a y-axis of the workpiece coordinate system C4 is parallel (or coincides) with the axis B, and a z-axis of the workpiece coordinate system C4 is parallel to the central axes of the through holes H1 and H2.

Figure 5:
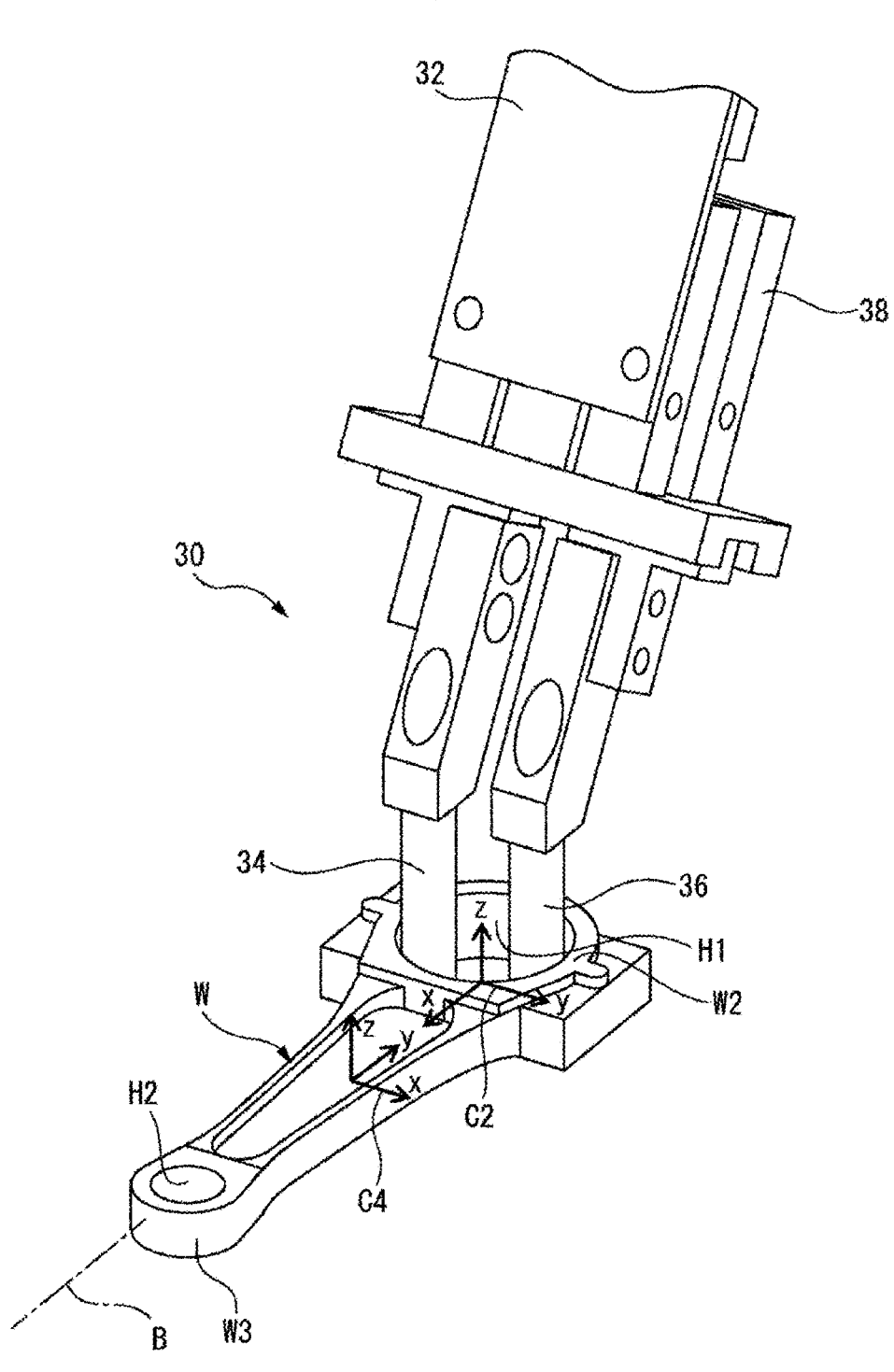
FIG. 5 illustrates a state in which the hand illustrated in FIG. 3 grips the workpiece illustrated in FIG. 4.

FIG. 5 illustrates an example of a state in which the robot 12 grips the workpiece W with the hand 30. In the example illustrated in FIG. 5, the hand 30 grips the large ring W2 of the workpiece W with the claw parts 34 and 36 by opening the claw parts 34 and 36 inserted into the through hole H1. To cause the robot 12 to perform the operation of gripping the workpiece W as illustrated in FIG. 5, teaching the position and orientation at which the robot 12 grips the workpiece W with the hand 30 is required.

The following describes a method of teaching the robot 12 an operation for gripping the workpiece W in the robot system 10. First, an operator causes the hand 30 of the robot 12 to grip the workpiece W at a gripping position that the operator wants to teach. For example, the operator controls the teaching device 18 to jog the robot 12, so that the workpiece W is gripped by the hand 30.

More specifically, the operator, while viewing the display device 56 of the teaching device 18, operates the input device 58 to move the hand 30 by the mechanical part 42 of the robot 12 and inserts the closed claw parts 34 and 36 into the through hole H1 of the workpiece W arranged at a predetermined storage location. Subsequently, the operator grips the workpiece W by operating the input device 58 to open the claw parts 34 and 36 and pressing the claw parts 34 and 36 against the inner wall surface of the through hole H1.

At this time, the operator causes the robot 12 to jog so that the hand 30 grips the workpiece W at the gripping position that the operator wants to teach. Hereafter, a case in which the operator causes the hand 30 to grip the workpiece W at the gripping position illustrated in FIG. 5, will be described. Subsequently, the operator operates the input device 58 to jog the robot 12 and moves the hand 30 by the mechanical part 42 of the robot 12 so that the workpiece W gripped by the hand 30 is within the field of view of the vision sensor 14.

Subsequently, the operator operates the input device 58 to cause the vision sensor 14 to image the workpiece W gripped by the hand 30. The vision sensor 14 receives an imaging command from the teaching device 18 via the controller 16 and images image data $ID_1$ of the workpiece W. An example of the image data $ID_1$ is illustrated in FIG. 6.

Figure 6:
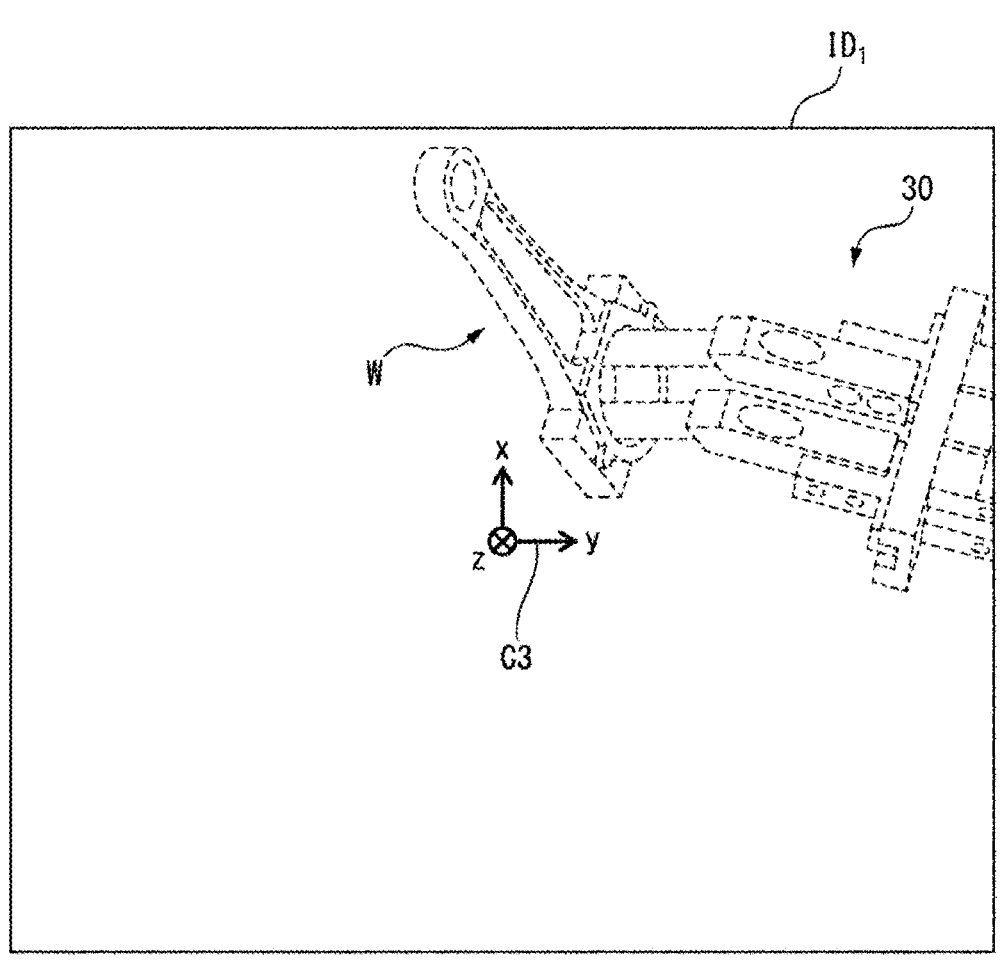
FIG. 6 is an example of image data in which a vision sensor illustrated in FIG. 1 images the workpiece gripped by the hand.

In the example illustrated in FIG. 6, visual features (edge, hole, apex, or the like) of the workpiece W and the hand 30 are displayed as a three-dimensional point cloud in the image data $ID_1$. Each point constituting the three-dimensional point cloud includes the information of the above-described distance d and can be represented as three-dimensional coordinates $(X_S, Y_S, Z_S)$ in the sensor coordinate system C3. That is, in the present embodiment, the image data $ID_1$ is three-dimensional image data.

The processor 50 of the teaching device 18 acquires the image data $ID_1$ from the vision sensor 14 through the controller 16 and the I/O interface 54. Thus, in the present embodiment, the processor 50 serves as an image data acquisition unit 82 (FIG. 2) that acquires the image data ID of the workpiece W imaged by the vision sensor 14 when the robot 12 grips the workpiece W with the hand 30.

Subsequently, based on the image data $ID_1$, the processor 50 acquires the workpiece position data $WPD_1$ indicating the position and orientation of the workpiece W in the robot coordinate system C1 when the vision sensor 14 images the image data $ID_1$. Specifically, the processor 50 first obtains a workpiece model WM which models the workpiece W. This workpiece model WM is, for example, a three-dimensional CAD model, which is stored in advance in the memory 52.

Figure 7:
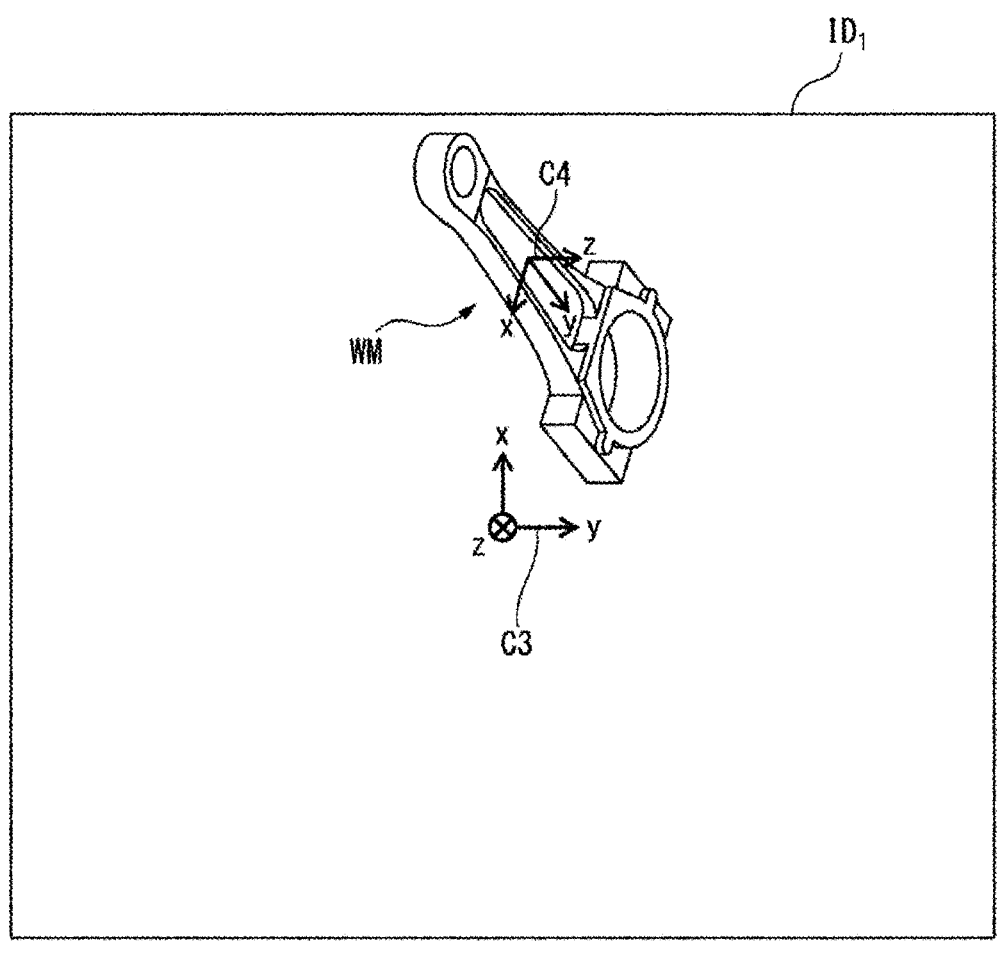
FIG. 7 schematically illustrates a state in which a workpiece model is applied to the image data illustrated in FIG. 6.

The processor 50 analyzes the three-dimensional point cloud image of the workpiece W shown in the image data $ID_1$ using a predetermined pattern matching parameter and arranges the workpiece model WM in the image data $ID_1$ in a simulated manner so as to match the workpiece W shown in the image data $ID_1$. FIG. 7 illustrates the workpiece model WM arranged in the image data $ID_1$ in a simulated manner. In FIG. 7, the image of the hand 30 is omitted for ease of understanding.

Subsequently, the processor 50 sets the workpiece coordinate system C4 in the positional relationship illustrated in FIG. 4 with respect to the workpiece model WM arranged in the image data $ID_1$. This workpiece coordinate system C4 indicates the position and orientation of the workpiece W shown in the image data $ID_1$ in the sensor coordinate system C3 and is represented as coordinates $Q_{SW\_1}$ $(X_{SW\_1}, Y_{SW\_1}, Z_{SW\_1}, W_{SW\_1}, P_{SW\_1}, R_{SW\_1})$ (first coordinates) in the sensor coordinate system C3.

Here, the coordinates $(X_{SW\_1}, Y_{SW\_1}, Z_{SW\_1})$ indicate the origin position of the workpiece coordinate system C4 in the sensor coordinate system C3, and the coordinates ($W_{SW\_1}$, $P_{SW\_1}$, $R_{SW\_1}$) indicate the direction (so-called yaw, pitch, roll) of each axis of the workpiece coordinate system C4 in the sensor coordinate system C3. The processor 50 acquires the coordinates $Q_{SW\_1}$ of the workpiece coordinate system C4 in the sensor coordinate system C3 as data indicating the position and orientation, in the sensor coordinate system C3, of the workpiece W shown in the image data $ID_1$.

Subsequently, the processor 50 uses the above-described transformation matrix M2 to transform the acquired coordinates $Q_{SW\_1}$ into the robot coordinate system C1, thereby obtaining coordinates $Q_{RW\_1}$ ($X_{RW\_1}$, $Y_{RW\_1}$, $Z_{RW\_1}$, $W_{RW\_1}$, $P_{RW\_1}$, $R_{RW\_1}$) (second coordinates) of the workpiece coordinate system C4 illustrated in FIG. 7, in the robot coordinate system C1. These coordinates $Q_{RW\_1}$ are data indicating the position and orientation, in the robot coordinate system C1, of the workpiece W (specifically, the workpiece model WM in FIG. 7) shown in the image data $ID_1$.

The processor 50 acquires these coordinates $Q_{RW\_1}$ as workpiece position data $WPD_1$. Thus, in the present embodiment, the processor 50 serves as a workpiece position acquisition unit 84 (FIG. 2) that acquires workpiece position data $WPD_1$ (coordinates $Q_{RW\_1}$) based on the image data $ID_1$.

On the other hand, the processor 50 acquires hand position data $HPD_1$ indicating the position and orientation of the hand 30 in the robot coordinate system C1 when the vision sensor 14 images the image data $ID_1$. Specifically, the processor 50 acquires, as the hand position data $HPD_1$, the coordinates $Q_{RT\_1}$ ($X_{RT\_1}$, $Y_{RT\_1}$, $Z_{RT\_1}$, $W_{RT\_1}$, $P_{RT\_1}$, $R_{RT\_1}$) (third coordinates) of the tool coordinate system C2 in the robot coordinate system C1 when the vision sensor 14 images the image data $ID_1$. Thus, in the present embodiment, the processor 50 serves as a hand position acquisition unit 86 (FIG. 2) that acquires the hand position data $HPD_1$ (coordinates $Q_{RT\_1}$).

Subsequently, based on the workpiece position data $WPD_1$ and the hand position data $HPD_1$ that are acquired, the processor 50 acquires teaching position data $TPD_1$ indicating the positional relationship between the hand 30 and the workpiece W in the control coordinate system C when the vision sensor 14 images the image data $ID_1$.

As an example, the processor 50 transforms the coordinates $Q_{RW\_1}$ as the workpiece position data $WPD_1$ into the coordinates of the tool coordinate system C2 represented by the coordinates $Q_{RT\_1}$ as the hand position data $HPD_1$, based on coordinates $Q_{RW\_1}$ acquired as the workpiece position data $WPD_1$ and the coordinates $Q_{RT\_1}$ acquired as the hand position data $HPD_1$. Since the positional relationship between the tool coordinate system C2 and the workpiece coordinate system C4 in the robot coordinate system C1 is known by the coordinates $Q_{RW\_1}$ and $Q_{RT\_1}$, the coordinates $Q_{RW\_1}$ of the workpiece coordinate system C4 in the robot coordinate system C1 can be transformed into the tool coordinate system C2.

With this coordinate transformation, the processor 50 acquires the coordinates $Q_{TW\_1}$ ($X_{TW\_1}$, $Y_{TW\_1}$, $Z_{TW\_1}$, $W_{TW\_1}$, $P_{TW\_1}$, $R_{TW\_1}$) of the workpiece coordinate system C4 in the tool coordinate system C2 when the vision sensor 14 images the image data $ID_1$. These coordinates $Q_{TW\_1}$ are data indicating the position and orientation (i.e., the origin position and direction of each axis of the workpiece coordinate system C4) of the workpiece W relative to the hand 30 (i.e., tool coordinate system C2) when the vision sensor 14 images the image data $ID_1$. The processor 50 acquires these coordinates $Q_{TW\_1}$ as the teaching position data $TPD_1$.

As another example, based on the coordinates $Q_{RW\_1}$ as the workpiece position data $WPD_1$ and the coordinates $Q_{RT\_1}$ as the hand position data $HPD_1$, the processor 50 transforms the coordinates $Q_{RT\_1}$ as the hand position data $HPD_1$ into the coordinates of the workpiece coordinate system C4 represented by the coordinates $Q_{RW\_1}$ as the workpiece position data $WPD_1$. Thus, the processor 50 acquires coordinates $Q_{WT\_1}$ ($X_{WT\_1}$, $Y_{WT\_1}$, $Z_{WT\_1}$, $W_{WT\_1}$, $P_{WT\_1}$, $R_{WT\_1}$) of the tool coordinate system C2 in the workpiece coordinate system C4 when the vision sensor 14 images the image data $ID_1$.

These coordinates $Q_{WT\_1}$ are data indicating the position and orientation (i.e., the origin position and the direction of each axis of the tool coordinate system C2) of the hand 30 relative to the workpiece W (i.e., the workpiece coordinate system C4) when the vision sensor 14 images the image data $ID_1$. The processor 50 acquires these coordinates $Q_{WT\_1}$ as teaching position data $TPD_1$.

Thus, in the present embodiment, the processor 50 serves as a teaching position acquisition unit 88 (FIG. 2), which acquires teaching position data $TPD_1$ (coordinates $Q_{TW\_1}$, coordinates $Q_{WT\_1}$) indicating the positional relationship between the hand 30 and the workpiece W in the control coordinate system C (tool coordinate system C2, workpiece coordinate system C4) when the vision sensor 14 images the image data $ID_1$, based on the workpiece position data $WPD_1$ and the hand position data $HPD_1$.

After acquiring the teaching position data $TPD_1$, the operator operates the input device 58 to change the orientation of the hand 30 while gripping the workpiece W by the operation of the mechanical part 42 of the robot 12. For example, the operator operates the input device 58 to enter input data for rotating the hand 30 by a predetermined angle θ (e.g., 10 degrees) around the x-axis, y-axis, or z-axis of the tool coordinate system C2, which is set in the robot coordinate system C1 at this point.

Alternatively, the operator may enter input data to rotate the hand 30 by a predetermined angle θ about the x-axis, y-axis, or z-axis of the workpiece coordinate system C4, which is set in the robot coordinate system C1 at this point. For example, when the y-axis of the workpiece coordinate system C4 coincides with the axis B of the workpiece W, the operator may enter input data to rotate the hand 30 around the y-axis (i.e., axis B) of the workpiece coordinate system C4.

In response to input data from the operator, the processor 50 sends a command to the servo motors 40 of the robot 12 via the controller 16 to operate the mechanical part 42 so as to change the orientation of the hand 30 gripping the workpiece W. Thus, in the present embodiment, the processor 50 serves as a robot control unit 90 (FIG. 2) that operates the robot 12 so as to change the orientation of the hand 30.

When the orientation of the hand 30 is changed, the operator operates the input device 58 to cause the vision sensor 14 to image the workpiece W gripped by the hand 30, and the processor 50, which serves as the image data acquisition unit 82, acquires image data $ID_2$ of the workpiece W. Subsequently, the processor 50 serves as the workpiece position acquisition unit 84 and acquires the coordinates $Q_{SW\_2}$ ($X_{SW\_2}$, $Y_{SW\_2}$, $Z_{SW\_2}$, $W_{SW\_2}$, $P_{SW\_2}$, $R_{SW\_2}$) (first coordinates) of the workpiece coordinate system C4 in the sensor coordinate system C3 by applying the workpiece model WM to the image data $ID_2$ by the above-described method.

Subsequently, the processor 50 serves as the workpiece position acquisition unit 84 and acquires the coordinates $Q_{RW\_2}$ ($X_{RW\_2}$, $Y_{RW\_2}$, $Z_{RW\_2}$, $W_{RW\_2}$, $P_{RW\_2}$, $R_{RW\_2}$) (second coordinates) of the workpiece coordinate system C4 in the robot coordinate system C1, as workpiece position data $WPD_2$ when the image data $ID_2$ is imaged, by transforming the acquired coordinates $Q_{SW\_2}$ into the robot coordinate system C1 by the above-described method.

In addition, the processor 50 serves as the hand position acquisition unit 86 and acquires the coordinates $Q_{RT\_2}$ ($X_{RT\_2}$, $Y_{RT\_2}$, $Z_{RT\_2}$, $W_{RT\_2}$, $P_{RT\_2}$, $R_{RT\_2}$) (third coordinates) of the tool coordinate system C2 in the robot coordinate system C1 as hand position data $HPD_2$ during imaging of the image data $ID_2$ by the above-described method.

Subsequently, the processor 50 serves as the teaching position acquisition unit 88 and acquires the coordinates $Q_{TW\_2}$ ($X_{TW\_2}$, $Y_{TW\_2}$, $Z_{TW\_2}$, $W_{TW\_2}$, $P_{TW\_2}$, $R_{TW\_2}$) of the workpiece coordinate system C4 in the tool coordinate system C2 or the coordinates $Q_{WT\_2}$ ($X_{WT\_2}$, $Y_{WT\_2}$, $Z_{WT\_2}$, $W_{WT\_2}$, $P_{WT\_2}$, $R_{WT\_2}$) of the tool coordinate system C2 in the workpiece coordinate system C4, as the teaching position data $TPD_2$ during imaging of the image data $ID_2$ by the above-described method.

In this way, the operator operates the input device 58 to repeatedly change the orientation of the hand 30, the vision sensor 14 images the workpiece W gripped by the hand 30 each time the orientation of the hand 30 is changed, and the processor 50 serves as the image data acquisition unit 82 to acquire a plurality of pieces of image data $ID_n$ (n=1, 2, 3, ... ) imaged by the vision sensor 14.

The processor 50 serves as the workpiece position acquisition unit 84 to acquire workpiece position data $WPD_n$: coordinates $Q_{RW\_n}$ ($X_{RW\_n}$, $Y_{RW\_n}$, $Z_{RW\_n}$, $W_{RW\_n}$, $P_{RW\_n}$, $R_{RW\_n}$) when each image data $ID_n$ is imaged, by the above-described method and serves as the hand position acquisition unit 86 to acquire hand position data $HPD_n$: coordinates $Q_{RT\_n}$ ($X_{RT\_n}$, $Y_{RT\_n}$, $Z_{RT\_n}$, $W_{RT\_n}$, $P_{RT\_n}$, $R_{RT\_n}$) when each image data $ID_n$ is imaged, by the above-described method.

Subsequently, the processor 50 serves as the teaching position acquisition unit 88 and acquires teaching position data $TPD_n$: coordinates $Q_{TW\_n}$ ($X_{TW\_n}$, $Y_{TW\_n}$, $Z_{TW\_n}$, $W_{TW\_n}$, $P_{TW\_n}$, $R_{TW\_n}$) or coordinates $Q_{WT\_n}$ ($X_{WT\_n}$, $Y_{WT\_n}$, $Z_{WT\_n}$, $W_{WT\_n}$, $P_{WT\_n}$, $R_{WT\_n}$) when each image data $ID_n$ is imaged, based on the corresponding workpiece position data $WPD_n$(coordinates $Q_{RW\_n}$) and the corresponding hand position data $HPD_n$(coordinates $Q_{RT\_n}$) that are acquired, by the above-described method. Thus, the processor 50 can acquire a plurality of pieces of teaching position data $TPD_n$ corresponding to the various orientations of the hand 30 and the workpiece W.

Subsequently, the processor 50 serves as the teaching position acquisition unit 88 and obtains, based on the plurality of pieces of teaching position data $TPD_n$ that are acquired, new teaching position data $TPD_0$ that is to be used in the operation to cause the robot 12 to actually grip the workpiece W with the hand 30. The following describes how the processor 50 obtains new teaching position data $TPD_0$ upon acquiring the coordinates $Q_{TW\_n}$ ($X_{TW\_n}$, $Y_{TW\_n}$, $Z_{TW\_n}$, $W_{TW\_n}$, $P_{TW\_n}$, $R_{TW\_n}$) of the tool coordinate system C2 as the teaching position data $TPD_n$.

First, for each of the plurality of coordinates $Q_{TW\_n}$, the processor 50 performs processing PR1, which excludes coordinates outside of the predetermined allowable range. Specifically, the processor 50 performs the processing PR1, which excludes coordinates outside of the allowable range, for coordinates ($X_{TW\_n}$, $Y_{TW\_n}$, $Z_{TW\_n}$) representing positions in the coordinates $Q_{TW\_n}$.

As an example, the processor 50 obtains the distance $\Delta_n$ from the origin of the tool coordinate system C2, from the equation: $\Delta_n = (X_{TW\_n}{}^2 + Y_{TW\_n}{}^2 + Z_{TW\_n}{}^2)^{1/2}$. Subsequently, the processor 50 determines whether or not the obtained distance $\Delta_n$ is within a predetermined allowable range [$\Delta_{th1}$, $\Delta_{th2}$], and when the distance $\Delta_n$ is within the allowable range [$\Delta_{th1}$, $\Delta_{th2}$] (i.e., $\Delta_{th1} \leq \Delta n \leq \Delta_{th2}$), the acquired coordinates $Q_{TW\_n}$ are registered in the memory 52 as the active coordinates group GRP, while when the distance $\Delta_n$ is outside of the allowable range [$\Delta_{th1}$, $\Delta_{th2}$] (i.e., $\Delta n < \Delta_{th1}$, or $\Delta_{th2} < \Delta^n$), the acquired coordinates $Q_{TW\_n}$ are excluded (or deleted from the memory 52) from the active coordinates group GRP.

As another example, the processor 50 obtains the average coordinates $Q_{TW\_AV}$ ($X_{TW\_AV}$, $Y_{TW\_AV}$, $Z_{TW\_AV}$) of the coordinates $Q_{TW\_n}$ ($X_{TW\_n}$, $Y_{TW\_n}$, $Z_{TW\_n}$). Specifically, the processor 50 obtains the average coordinates $Q_{TW\_AV}$ ($X_{TW\_AV}$, $Y_{TW\_AV}$, $Z_{TW\_AV}$) from the equations: $X_{TW\_AV} = 1/n \cdot \Sigma(X_{TW\_n})$, $Y_{TW\_AV} = 1/n \cdot \Sigma(Y_{TW\_n})$, and $Z_{TW\_AV} = 1/n \cdot \Sigma (Z_{TW\_n})$.

Furthermore, the processor 50 obtains the standard deviation $\sigma_X$, $\sigma_Y$ and $\sigma_Z$ of the coordinates $Q_{TW\_n}$ ($X_{TW\_n}$, $Y_{TW\_n}$, $Z_{TW\_n}$), respectively. For example, the processor 50 obtains the above from the following equations: $\sigma_X = (1/n \cdot \Sigma\{X_{TW\_n} - X_{TW\_AV}\})^{1/2}$, $\sigma_Y = (1/n \cdot \Sigma\{Y_{TW\_n} - Y_{TW\_AV}\})^{1/2}$, $\sigma_Z = (1/n \cdot \Sigma\{Z_{TW\_n} - Z_{TW\_AV}\})^{1/2}$.

Subsequently, for each of the coordinates $X_{TW\_n}$, $Y_{TW\_n}$, and $Z_{TW\_n}$ in the coordinates $Q_{TW\_n}$, the processor 50 determines the allowable range using the obtained average and standard deviation a and the predetermined coefficient $\alpha$ (e.g., $\alpha$ is a positive integer) as follows: [$X_{TW\_AV} - \alpha\sigma_X$, $X_{TW\_AV} + \alpha\sigma_X$] (i.e., $X_{TW\_AV} - \alpha\sigma_X \leq X_{TW\_n} \leq X_{TW\_AV} + \alpha\sigma_X$), [$Y_{TW\_AV} - \alpha\sigma_Y$, $Y_{TW\_AV} + \alpha\sigma_Y$] (i.e., $Y_{TW\_AV} - \alpha\sigma_Y \leq Y_{TW\_n} \leq Y_{TW\_AV} + \alpha\sigma_Y$), and [$Z_{TW\_AV} - \alpha\sigma_Z$, $Z_{TW\_AV} + \alpha\sigma_Z$] (i.e., $Z_{TW\_AV} - \alpha\sigma_Z \leq Z_{TW\_n} \leq Z_{TW\_AV} + \alpha\sigma_Z$).

The processor 50 determines whether or not the coordinates $X_{TW\_n}$ are within the allowable range [$X_{TW\_AV} - \sigma_X$, $X_{TW\_AV} + \sigma_X$], whether or not the coordinates $Y_{TW\_n}$ are within the allowable range [$Y_{TW\_AV} - \sigma_Y$, $Y_{TW\_AV} + \sigma_Y$], and whether or not the coordinates $Z_{TW\_n}$ are within the allowable range [$Z_{TW\_AV} - \sigma_Z$, $Z_{TW\_AV} + \sigma_Z$].

Subsequently, the processor 50 registers the acquired coordinates $Q_{TW\_n}$ as the active coordinates group GRP when all of the coordinates $X_{TW\_n}$, $Y_{TW\_n}$, and $Z_{TW\_n}$ are within the allowable range, while excludes the acquired coordinates $Q_{TW\_n}$ from the active coordinates group GRP when at least one of the coordinates $X_{TW\_n}$, $Y_{TW\_n}$, and $Z_{TW\_n}$ are outside of the allowable range.

In addition, the processor 50 performs the processing PR1, which excludes the coordinates outside of the allowable range, for the coordinates ($W_{TW\_n}$, $P_{TW\_n}$, $R_{TW\_n}$) representing the orientation in the coordinates $Q_{TW\_n}$. Specifically, the processor 50 first represents the coordinates ($W_{TW\_n}$, $P_{TW\_n}$, $R_{TW\_n}$) indicating the orientation as a 3×3 known matrix $M3_n$.

In this matrix $M3_n$, a vector $VT1_n$ represented by three parameters in a first column is a unit vector representing the rotation component around the x-axis of the tool coordinate system C2, a vector $VT2_n$ represented by three parameters in a second column is a unit vector representing the rotation component around the y-axis of the tool coordinate system C2, and a vector $VT3_n$ represented by three parameters in a third column is a unit vector representing the rotation component around the z-axis of the tool coordinate system C2.

For example, the processor 50 obtains the inner product $IP1_n$ of the vector $VT1_n$ of the matrix $M3_n$ representing the first coordinates $Q_{TW\_n}$ ($W_{TW\_n}$, $P_{TW\_n}$, $R_{TW\_n}$) and the vector $VT1_{n+1}$ of the matrix $M3_{n+1}$ representing the second coordinates $Q_{TW\_n+1}$ ($W_{TW\_n+1}$, $P_{TW\_n+1}$, $R_{TW\_n+1}$). This inner product $IP1_n$ represents an angle $\varphi 1$ (specifically, cos $\varphi 1$) between the vector $VT1_{\_n}$ and the vector $VT1_{\_n+1}$, that is, the amount of change in the rotation component around the x-axis of the tool coordinate system C2.

The processor 50 also obtains inner product $IP3_n$ of the vector $VT3_{\_n}$ of the matrix $M3_{\_n}$ and the vector $VT3_{\_n+1}$ of the matrix $M3_{\_n+1}$. This inner product $IP3_n$ represents the angle $\varphi 3$ (specifically, cos $\varphi 3$) between the vector $VT3_{\_n}$ and the vector $VT3_{\_n+1}$, that is, the amount of change in the rotation component around the z-axis of the tool coordinate system C2.

Subsequently, the processor 50 determines whether or not the obtained inner product $IP1_n$ is equal to or more than a predetermined threshold value $IP1_{th}$ ($IP1_n \geq IP1_{th}$), and also determines whether or not the obtained inner product $IP3_n$ is equal to or more than a predetermined threshold value $IP3_{th}$ ($IP3_n \geq IP3_{th}$). When $IP1_n \geq IP1_{th}$ and $IP3_n > IP3_{th}$, the processor 50 registers both of the acquired first coordinates $Q_{TW\_n}$ and second coordinates $Q_{TW\_n+1}$ as active coordinates group GRP in the memory 52.

On the other hand, the processor 50 excludes (or deletes from the memory 52) from the active coordinates group GRP, either the acquired first coordinates $Q_{TW\_n}$ or the second coordinates $Q_{TW\_n}+1$ when $IP1_n < IP1_{th}$ or $IP3_n < IP3_{th}$. The operator may decide in advance which of the first coordinates $Q_{TW\_n}$ and the second coordinates $Q_{TW\_n+1}$ are to be excluded.

The processor 50 may obtain the inner product $IP1_i$ of the vector $VT1_{\_n}$ of the matrix $M3_{\_n}$ representing the first coordinates $Q_{TW\_n}$ ($W_{TW\_n}$, $P_{TW\_n}$, $R_{TW\_n}$) and each of the vectors $VT1_{\_i}$ ("i" is a positive integer other than "n") of the matrix $M3_{\_i}$ representing the coordinates $Q_{TW\_1}$ ($W_{TW\_1}$, $P_{TW\_1}$, $R_{TW\_1}$) other than the first coordinates $Q_{TW\_n}$. Similarly, the processor 50 may obtain an inner product $IP3_i$ of the vector $VT3_{\_n}$ of the matrix $M3_{\_n}$ of the first coordinates $Q_{TW\_n}$ and each of the vectors $VT3_{\_i}$ of the matrix $M3_{\_i}$ of the coordinates $Q_{TW\_i}$ other than the first coordinates $Q_{TW\_n}$.

Subsequently, the processor 50 may determine whether or not each of the obtained inner products $IP1_i$ is equal to or more than a threshold value $IP1_{th}$ ($IP1_i \geq IP1_{th}$) and also determines whether or not each of the obtained inner products $IP3_i$ is equal to or more than a threshold value $IP3_{th}$ ($IP3_i \geq IP3_{th}$). When at least one (or all) of the obtained inner products $IP1_i$ satisfies $IP1_i \geq IP1_{th}$ and at least one (or all) of the obtained inner products $IP3_i$ satisfies $IP3_i \geq IP3_{th}$, the processor 50 may register the acquired first coordinates $Q_{TW\_n}$ in the memory 52 as the active coordinates group GRP.

On the other hand, the processor 50 may exclude the obtained first coordinates $Q_{TW\_n}$ from the active coordinates group GRP when all (or at least one) of the obtained inner products $IP1_i$ are $IP1_i < IP1_{th}$, or when all (or at least one) of the obtained inner products $IP3_i$ are $IP3_i < IP3_{th}$. The processor 50 may repeat such processing PR1 for all of the acquired coordinates $Q_{TW\_n}$.

Alternatively, the processor 50 obtains the resultant vector $VT1_R = \Sigma(VT1_{\_n})$ for the vector $VT1_{\_1}$, $VT1_{\_2}$, $VT1_{\_3}$, . . . $VT1_{\_n}$ and obtains the inner product $IP1_{R\_n}$ of the resultant vector $VT1_R$ and each vector $VT1_{\_n}$. Subsequently, the processor 50 determines whether or not the obtained inner product $IP1_{R\_n}$ is equal to or more than a predetermined threshold value $IP1_{Rth}$ ($IP1_{R\_n} \geq IP1_{Rth}$). The processor 50 registers coordinates $Q_{TW\_n}$ as the active coordinates group GRP in the memory 52 when $IP1_{R\_n} \geq IP1_{Rth}$, while excludes (or deletes from the memory 52) the coordinates $Q_{TW\_n}$ from the active coordinates group GRP when $IP1_{R\_n} \leq IP1_{Rth}$.

Similarly to the vector $VT1_{\_n}$, the processor 50 can also determine the coordinates $Q_{TW\_n}$ to be excluded from the active coordinates group GRP for the vector $VT2_{\_n}$ by obtaining the resultant vector $VT2_R = \Sigma(VT2_{\_n})$, obtaining the inner product $IP2_{R\_n}$ of the resultant vector $VT2_R$ and each vector $VT2_{\_n}$, and comparing the obtained inner product with the threshold value $IP2_{Rth}$, or for the $VT3_{\_n}$ by obtaining the resultant vector $VT3_R = \Sigma(VT3_{\_n})$, obtaining the inner product $IP3_{R\_n}$ of the resultant vector $VT3_R$ and each vector $VT3_{\_n}$, and comparing the obtained inner product with the threshold value $IP3_{Rth}$.

In this way, the processor 50 performs the processing PR1 to exclude for each of a plurality of coordinates $Q_{TW\_n}$. This processing PR1 allows to exclude the coordinates $Q_{TW\_n}$ acquired by false detection. The threshold value $\Delta_{th1}$, $\Delta_{th2}$, $IP1_{th}$, $IP3_{th}$, $IP1_{Rth}$, $IP2_{Rth}$ or $IP3_{Rth}$ (or coefficient $\alpha$), which defines the various allowable ranges described above, is predetermined by the operator.

After the excluding processing PR1, the processor 50 performs processing PR2 that averages coordinates $Q_{TW\_m}$ (m represents number n of the coordinates $Q_{TW\_n}$ registered in the active coordinates group GRP) registered in the active coordinates group GRP. Specifically, the processor 50 obtains the average coordinates ($X_{TW\_0}$, $Y_{TW\_0}$, $Z_{TW\_0}$) of the coordinates ($X_{TW\_m}$, $Y_{TW\_m}$, $Z_{TW\_m}$) representing a position in the coordinates $Q_{TW\_m}$ registered in the active coordinates group GRP.

Specifically, processor 50 obtains the average coordinates ($X_{TW\_0}$, $Y_{TW\_0}$, $Z_{TW\_0}$) from the equations $X_{TW\_0} = 1/k \cdot \Sigma (X_{TW\_m})$, $Y_{TW\_0} = 1/k \cdot \Sigma (Y_{TW\_m})$, and $Z_{TW\_0} = 1/k \cdot \Sigma (Z_{TW\_m})$. In these equations, "k" indicates the number of the coordinates $Q_{TW\_m}$ registered in the active coordinates group GRP.

Additionally, the processor 50 performs the processing PR2, which averages coordinates ($W_{TW\_m}$, $P_{TW\_m}$, $R_{TW\_m}$) representing the orientation in the coordinates $Q_{TW\_m}$ registered in the active coordinates group GRP. Specifically, for the coordinates ($W_{TW\_m}$, $P_{TW\_m}$, $R_{TW\_m}$) representing the orientation, the processor 50 obtains the resultant vector $VT1_R = \Sigma(VT1_{\_m})$ of the vector $VT1_{\_m}$ and the resultant vector $VT3_R = \Sigma(VT3_{\_m})$ of the vector $VT3_{\_m}$, as described above.

Subsequently, the processor 50 obtains an outer product OP1 of the unit vector $VT1_R'$ of the resultant vector $VT1_R$ and the unit vector $VT3_R'$ of the resultant vector $VT3_R$. This outer product OP1 represents a vector in the direction perpendicular to the unit vector $VT1_R'$ and the unit vector $VT3_R'$. Subsequently, the processor 50 obtains a unit vector $VT2_R'$ by normalizing the vector represented by the outer product OP1.

Subsequently, the processor 50 obtains an outer product OP2 of the unit vector $VT2_R'$ and the unit vector $VT3_R'$ and obtains the unit vector $VT1_R'$ by normalizing the vector represented by the outer product OP2. Thus, the processor 50 obtains unit vectors $VT1_R''$, $VT2_R'$ and $VT3_R'$.

Subsequently, the processor 50 obtains the orientation ($W_{TW\_0}$, $P_{TW\_0}$, $R_{TW\_0}$) represented by these unit vectors $VT1_R''$, $VT2_R'$ and $VT3_R'$. The coordinates in this orientation indicate the direction of each axis of the workpiece coordinate system C4 in the tool coordinate system C2. The x-axis direction of the workpiece coordinate system C4 is the direction of the above-described unit vector $VT1_R''$, the y-axis direction is the direction of the unit vector $VT2_R'$, and the z-axis direction is the direction of the unit vector $VT3_R'$.

Alternatively, to obtain the coordinates ($W_{TW\_0}$, $P_{TW\_0}$, $R_{TW\_0}$) of the orientation, the processor 50 may obtain the unit vector $VT2_R'$ of the resultant vector $VT2_R = \Sigma(VT2_{\_m})$ of the vector $VT2_{\_m}$ together with the above-described unit vector $VT1_R'$, and obtain an outer product OP3 of the unit vector $VT1_R'$ and the unit vector $VT2_R'$.

Subsequently, the processor 50 may obtain the unit vector $VT3_R'$ by normalizing the vector represented by the outer product OP3, obtain an outer product OP4 of the unit vector $VT3_R'$ and the unit vector $VT1_R'$, and obtain the unit vector $VT2_R'$ by normalizing the vector represented by the outer product OP4. The processor 50 can obtain the coordinates $(W_{TW\_0}, P_{TW\_0}, R_{TW\_0})$ of the orientation from the thus obtained unit vectors $VT1_R'$, $VT2_R'$ and $VT3_R'$.

By the above-described method, the processor 50 performs the processing PR2, which averages coordinates $Q_{TW\_m}$ registered in the active coordinates group GRP. As a result, the processor 50 can acquire the coordinates $Q_{TW\_0}$ $(X_{TW\_0}, Y_{TW\_0}, Z_{TW\_0}, W_{TW\_0}, P_{TW\_0}, R_{TW\_0})$ as the teaching position data $TPD_0$.

These coordinates $Q_{TW\_0}$ indicate the origin position of the workpiece coordinate system C4 in the tool coordinate system C2 $(X_{TW\_0}, Y_{TW\_0}, Z_{TW\_0})$ and the direction of each axis $(W_{TW\_0}, P_{TW\_0}, R_{TW\_0})$. Thus, the processor 50 serves as the teaching position acquisition unit 88 and obtains one teaching position data $TPD_0$ (coordinates $Q_{TW\_0}$) from the acquired plurality of coordinates $Q_{TW\_n}$ (n=1, 2, 3, 4 . . . ).

It is to be understood that even when obtaining the coordinates $Q_{WT\_n}$ $(X_{WT\_n}, Y_{WT\_n}, Z_{WT\_n}, W_{WT\_n}, P_{WT\_n}, R_{WT\_n})$ of the tool coordinate system C2 in the workpiece coordinate system C4 as the teaching position data $TPD_n$, the processor 50 can obtain coordinates $Q_{WT\_0}$ $(X_{WT\_0}, Y_{WT\_0}, Z_{WT\_0}, W_{WT\_0}, P_{WT\_0}, R_{WT\_0})$ of the tool coordinate system C2 in the workpiece coordinate system C4 as new teaching position data $TPD_0$ by the above-described method.

Subsequently, the processor 50 uses the obtained teaching position data $TPD_0$ to generate an operation program OP in which the teaching position data $TPD_0$ (i.e., coordinates $Q_{TW\_0}$ or $Q_{WT\_0}$) is defined as an instruction code. Thus, the processor 50 serves as an operation program generating unit 92 (FIG. 2), which generates the operation program OP.

In the actual work line, the processor 70 of the controller 16 operates the robot 12 in accordance with the operation program OP and performs the operation of gripping and picking up the workpieces W that are stacked in pieces in the container A, by the hand 30. Specifically, the processor 70 operates the vision sensor 14 to image the workpiece W in the container A and acquires the imaged image data $ID_W$ (second image data) from the vision sensor 14.

Subsequently, the processor 70 acquires workpiece position data $WPD_W$ (second workpiece position data) indicating the position and orientation of the workpiece W in the robot coordinate system C1 shown in the image data $ID_W$, based on the acquired image data $ID_W$, as by the workpiece position acquisition unit 84 described above. Specifically, the processor 70 arranges the workpiece model WM to match the workpiece W shown in the image data $ID_W$ and sets the workpiece coordinate system C4 to the arranged workpiece model WM.

Subsequently, the processor 70 acquires the coordinates $Q_{RW\_W}$ $(X_{RW\_W}, Y_{RW\_W}, Z_{RW\_W}, W_{RW\_W}, P_{RW\_W}, R_{RW\_W})$ of the workpiece coordinate system C4 in the robot coordinate system C1 as workpiece position data $WPD_W$, by acquiring the coordinates $Q_{SW\_W}$ $(X_{SW\_W}, Y_{SW\_W}, Z_{SW\_W}, W_{SW\_W}, P_{SW\_W}, R_{SW\_W})$ of the sensor coordinate system C3 of the set workpiece coordinate system C4 and transforming the coordinates $Q_{SW\_W}$ into the robot coordinate system C1. Thus, the processor 70 acquires the workpiece position data $WPD_W$ (coordinates $Q_{RW\_W}$), which indicates the position and orientation of the workpiece W in the robot coordinate system C1.

Subsequently, based on the acquired workpiece position data $WPD_W$, and teaching position data $TPD_0$ defined in the operation program OP, the processor 70 determines the position and orientation of the hand 30 in the robot coordinate system C1 when gripping the workpiece W imaged by the vision sensor 14.

Specifically, the processor 70 obtains coordinates $Q_{RT\_0}$ $(X_{RT\_0}, Y_{RT\_0}, Z_{RT\_0}, W_{RT\_0}, P_{RT\_0}, R_{RT\_0})$ of the robot coordinate system C1, which has the positional relationship indicated by the teaching position data $TPD_0$ relative to the workpiece coordinate system C4 represented by the coordinates $Q_{RW\_W}$, by using the coordinates $Q_{RW\_W}$ acquired as the workpiece position data $WPD_W$ and the teaching position data $TPD_0$ (specifically, coordinates $Q_{TW\_0}$ or $Q_{WT\_0}$). The processor 70 determines the position and orientation of the hand 30 when gripping the workpiece W in the robot coordinate system C1 by setting the tool coordinate system C2 to the obtained coordinates $Q_{RT\_0}$.

Subsequently, the processor 70 moves the hand 30, by operating the mechanical part 42 so that the hand 30 keeping the claw parts 34 and 36 closed is arranged in the position and orientation determined by the tool coordinate system C2 set to the coordinates $Q_{RT\_0}$ Of the robot coordinate system C1. This inserts claw parts 34 and 36 into the through hole H1 of the workpiece W.

Subsequently, the processor 70 grips the large ring W2 of the workpiece W with the claw parts 34 and 36 by operating the claw part drive part 38 to open the claw parts 34 and 36. As a result, as illustrated in FIG. 5, the hand 30 is able to grip the workpiece W at the gripping position taught by the teaching position data $TPD_0$.

Subsequently, the processor 70 can pick up the workpiece W by operating the mechanical part 42 to evacuate the hand 30 that grips the workpiece W from the container A. Subsequently, the processor 70 performs the work of picking up the workpieces W, which are stacked in pieces in the container A, with the hand 30, by repeatedly executing the above-described sequence of operations for the respective workpieces W, which are stacked in pieces in the container A.

As described above, in the present embodiment, the processor 50 of the teaching device 18 serves as the image data acquisition unit 82, the workpiece position acquisition unit 84, the hand position acquisition unit 86, the teaching position acquisition unit 88, the robot control unit 90, and the operation program generating unit 92 to teach the position and orientation at which the robot 12 grips the workpiece W with the hand 30 in the robot coordinate system C1.

Thus, the image data acquisition unit 82, the workpiece position acquisition unit 84, the hand position acquisition unit 86, the teaching position acquisition unit 88, the robot control unit 90, and the operation program generating unit 92 constitute a device 100 (FIG. 2) of teaching the position and orientation at which the robot 12 grips the workpiece W with the hand 30. That is, in the present embodiment, the device 100 is implemented in the teaching device 18, and the processor 50 of the teaching device 18 performs the functions of the device 100.

In this device 100, the image data acquisition unit 82 acquires image data $ID_n$ in which the vision sensor 14 that is arranged at a known position of the control coordinate system C (robot coordinate system C1) images the workpiece W when the robot 12 grips the workpiece W with the hand 30. The workpiece position acquisition unit 84 acquires, based on the image data $ID_n$, the workpiece position data $WPD_n$ indicating the position and orientation of the workpiece W in the control coordinate system C (robot coordinate system C1) at the time of imaging the image data $ID_n$.

Additionally, the hand position acquisition unit 86 acquires hand position data $HPD_n$ indicating the position and orientation of the hand 30 in the control coordinate system C (robot coordinate system C1) at the time of imaging the image data $ID_n$. The teaching position acquisition unit 88 acquires the teaching position data $TPD_n$ indicating the positional relationship between the hand 30 and the workpiece W in the control coordinate system C (tool coordinate system C2, workpiece coordinate system C4) at the time of imaging the image data $ID_n$, based on the workpiece position data $WPD_n$ and the hand position data $HPD_n$.

Thus, by acquiring the teaching position data $TPD_n$, based on the image data $ID_n$ imaged when the hand 30 grips the workpiece W at the gripping position that the operator wants to teach, the gripping position that the operator wants to teach can be taught to the robot 12 with high accuracy.

Furthermore, in the device 100, the robot control unit 90 operates the robot 12 to repeatedly change the orientation of the hand 30 gripping the workpiece W. The image data acquisition unit 82 acquires a plurality of pieces of image data $ID_n$ imaged by the vision sensor 14 each time the robot control unit 90 changes the orientation of the hand 30. In addition, the workpiece position acquisition unit 84 acquires the workpiece position data $WPD_n$ based on each image data $ID_n$, and the hand position acquisition unit 86 acquires the hand position data $HPD_n$ at the time of imaging each image data $ID_n$.

Subsequently, the teaching position acquisition unit 88 acquires the teaching position data $TPD_n$ at the time of imaging each piece of image data $ID_n$ based on the corresponding workpiece position data $WPD_n$ and the corresponding hand position data $HPD_n$. By collecting a plurality of pieces of teaching position data $TPD_n$ based on pieces of the image data $ID_n$ of the workpiece W in various orientations in this way, the gripping position of the workpiece W can be taught to the robot 12 with higher accuracy.

Additionally, in the device 100, the teaching position acquisition unit 88 obtains new teaching position data $TPD_0$, which is to be used for the operation to cause the robot 12 to grip the workpiece W with the hand 30, based on the plurality of pieces of teaching position data $TPD_n$. Thus, by obtaining the teaching position data $TPD_0$ from the plurality of pieces of teaching position data $TPD_n$ corresponding to pieces of the image data $ID_n$ of the workpiece W in various orientations, the position and orientation of the hand 30 at the time of gripping each of the workpieces W in various orientations can be determined with higher accuracy by the teaching position data $TPD_0$.

In the device 100, the teaching position data $TPD_n$ is represented as the coordinates $Q_{TW\_n}$, $Q_{WT\_n}$ of the control coordinate system C (tool coordinate system C2, workpiece coordinate system C4).

The teaching position acquisition unit 88 obtains new teaching position data $TPD_0$ by excluding coordinates that are outside of the predetermined allowable range among the coordinates $Q_{TW\_n}$, $Q_{WT\_n}$ of the plurality of pieces of teaching position data $TPD_n$ and obtaining the average of the coordinates $Q_{TW\_m}$, $Q_{WT\_m}$.

According to this configuration, coordinates $Q_{TW\_n}$, $Q_{WT\_n}$ acquired by false detection or the like can be excluded, and by averaging the coordinates $Q_{TW\_m}$, $Q_{WT\_m}$, more accurate teaching position data $TPD_0$ can be obtained. Thus, the position and orientation of the hand 30 at the time of gripping each of the workpieces W in various orientations can be determined with higher accuracy. In the device 100, the operation program generating unit 92 generates the operation program OP in which the teaching position data $TPD_0$ is defined. With this configuration, the operation program OP that defines the teaching position data $TPD_0$ acquired as described above can be generated automatically.

In the device 100, the workpiece position acquisition unit 84 acquires, as workpiece position data $WPD_n$, data indicating the position and orientation of the workpiece model WM in the control coordinate system C (robot coordinate system C2) when the workpiece model WM is matched to the workpiece W (three-dimensional point cloud image) shown in the image data $ID_n$. With this configuration, the workpiece position data $WPD_n$ can be detected with high accuracy from the image data $ID_n$ imaged by the vision sensor 14.

Furthermore, in the device 100, the control coordinate system C includes the robot coordinate system C1, the workpiece coordinate system C4, the tool coordinate system C2 whose positional relationship with the robot coordinate system C1 is known, and the sensor coordinate system C3 whose positional relationship with the robot coordinate system C1 is known. The vision sensor 14 is disposed at a known position in the robot coordinate system C1.

Subsequently, the workpiece position acquisition unit 84 acquires the first coordinates $Q_{SW\_n}$ of the workpiece coordinate system C4 in the sensor coordinate system C3, which indicates the position and orientation of the workpiece W shown in the image data $ID_n$, and transforms the first coordinates $Q_{SW\_n}$ into the robot coordinate system C1, thereby acquiring the second coordinates $Q_{RW\_n}$ of the workpiece coordinate system C4 in the robot coordinate system C1 as the workpiece position data $WPD_n$.

In addition, the hand position acquisition unit 86 acquires the third coordinates $Q_{RT\_n}$ of the tool coordinate system C2 in the robot coordinate system C1 indicating the position and orientation of the hand 30 as the hand position data $HPD_n$. The teaching position acquisition unit 88 acquires the teaching position data $TPD_n$, as the coordinates $Q_{TW\_n}$ of the workpiece coordinate system C4 in the tool coordinate system C2, or as the coordinates $Q_{WT\_n}$ of the tool coordinate system C2 in the workpiece coordinate system C4, based on the second coordinates $Q_{RW\_n}$ and the third coordinates $Q_{RT\_n}$. According to this configuration, the teaching position data $TPD_n$ can be acquired as the coordinates $Q_{TW\_n}$ or $Q_{WT\_n}$ in the control coordinate system C, based on the robot coordinate system C1, the tool coordinate system C2, the sensor coordinate system C3, and the workpiece coordinate system C4, which are used as the control coordinate system C.

In the above-described embodiment, the operator manually operates the teaching device 18 to change the orientation of the hand 30 that grips the workpiece W. However, without being limited to this, the processor 50 may automatically perform a series of operations such as changing the orientation of the hand 30, acquiring the image data $ID_n$, acquiring the workpiece position data $WPD_n$, acquiring the hand position data $HPD_n$, and acquiring the teaching position data $TPD_n$.

Figure 8:
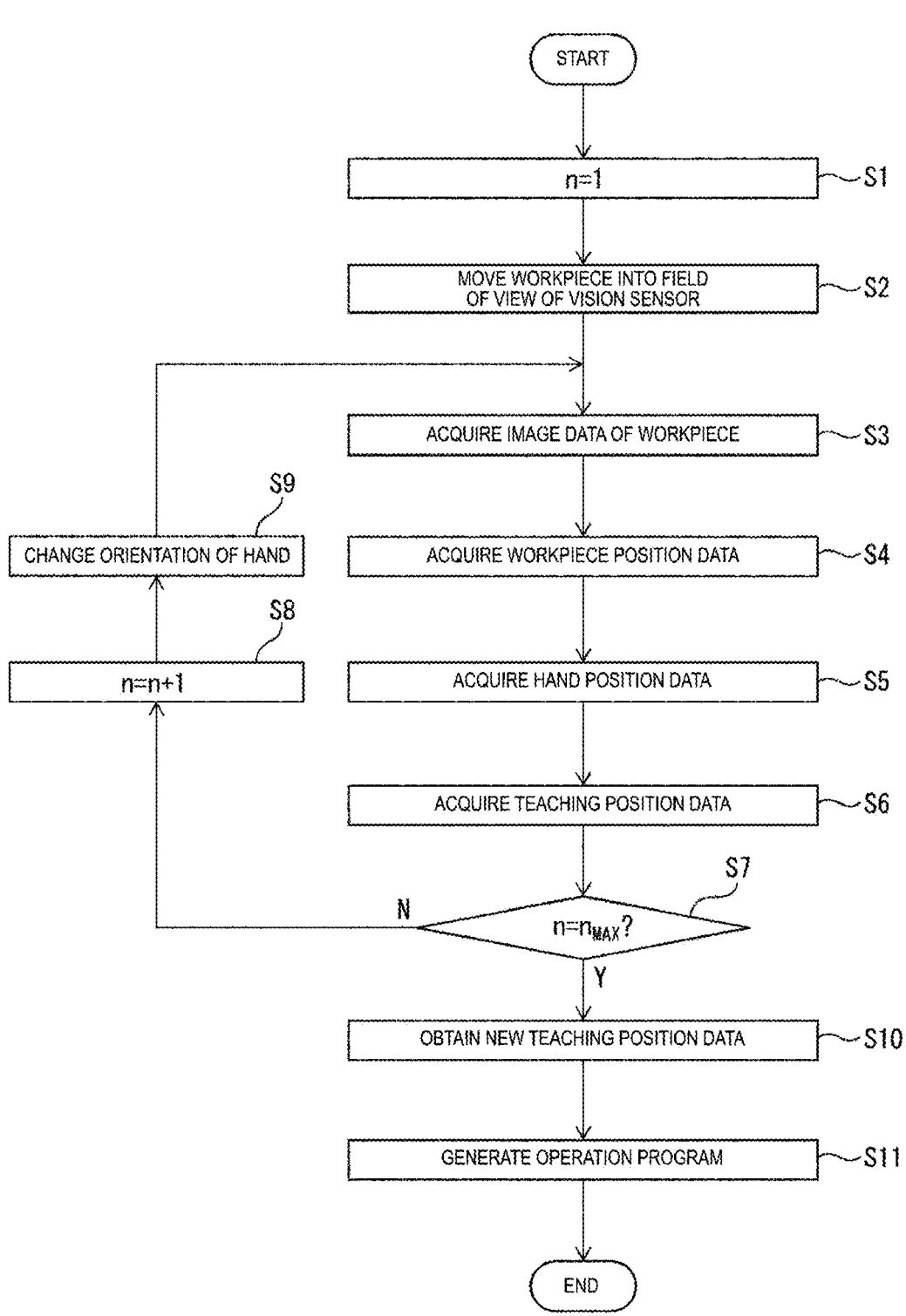
FIG. 8 is a flowchart illustrating an example of a method of teaching a robot the position and orientation to grip a workpiece by the hand in the robot system illustrated in FIG. 1.

Such an embodiment will be described below with reference to FIG. 8. The flow illustrated in FIG. 8 is started when the processor 50 of the teaching device 18 accepts a teaching start command CM. For example, when the operator operates the input device 58 of the teaching device 18 to cause the hand 30 to grip the workpiece W as illustrated in FIG. 5, the operator inputs the teaching start command CM into the teaching device 18.

In step S1, the processor 50 sets the number "n", which defines the number of pieces of teaching position data $TPD_n$ to be acquired, to "1". This number "n" corresponds to "n" of the image data $ID_n$, the workpiece position data $WPD_n$, the hand position data $HPD_n$, and the teaching position data $TPD_n$ described above.

In step S2, the processor 50 operates the mechanical part 42 of the robot 12 to move the workpiece W gripped by the hand 30 so as to be within the field of view of the vision sensor 14. As an example, the processor 50 may move the hand 30 along a predetermined movement path. This movement path can be defined by teaching the robot 12 in advance by the operator. As another example, the processor 50 may acquire coordinates of tool coordinate system C2 and sensor coordinate system C3 in the robot coordinate system C1 and move the hand 30 based on the coordinates.

In step S3, the processor 50 serves as the image data acquisition unit 82 to acquire the image data $ID_n$. Specifically, the processor 50 sends an imaging command to the vision sensor 14 and operates the vision sensor 14 to image the image data $ID_n$ of the workpiece W gripped by the hand 30. Subsequently, the processor 50 serves as the image data acquisition unit 82 to acquire the image data $ID_n$ from the vision sensor 14.

In step S4, the processor 50 serves as the workpiece position acquisition unit 84 to acquire the workpiece position data $WPD_n$(e.g., coordinates $Q_{RW\_n}$) based on the image data $ID_n$ acquired in the most recent step S3 by the above-described method. In step S5, the processor 50 serves as the hand position acquisition unit 86 to acquire the hand position data $HPD_n$(e.g., coordinates $Q_{RT\_n}$) at the time of imaging the image data $ID_n$ acquired in the most recent step S3 by the above-described method.

In step S6, the processor 50 serves as the teaching position acquisition unit 88 to acquire the teaching position data $TPD_n$(e.g., coordinates $Q_{TW\_n}$ or $Q_{WT\_n}$) based on the workpiece position data $WPD_n$ acquired in the most recent step S4 and the hand position data $HPD_n$ acquired in the most recent step S5 by the above-described method.

In step S7, the processor 50 determines whether or not the number "n" has reached a predetermined number $n_{MAX}$ ($n=n_{MAX}$). This number $n_{MAX}$ can be predetermined by the operator. When $n=n_{MAX}$, the processor 50 determines YES and proceeds to step S10, while when $n<n_{MAX}$, determines NO and proceeds to step S8. In step S8, the processor 50 increments the number "n" by "1" ($n=n+1$).

In step S9, the processor 50 serves as the robot control unit 90 to operate the mechanical part 42 of the robot 12 to change the orientation of the hand 30 gripping the workpiece W. Specifically, the processor 50 rotates the hand 30 around the x-axis, y-axis, or z-axis of the tool coordinate system C2, which is set in the robot coordinate system C1 at this point, by a predetermined angle θ.

Alternatively, the processor 50 rotates the hand 30 around the x-axis, y-axis, (i.e., axis B of the workpiece W) or z-axis of the workpiece coordinate system C4, which is set in the robot coordinate system C1 at this point, by an angle θ. The angle θ and direction in which the hand 30 is rotated when this step S9 is performed may be predetermined by the operator. Alternatively, the processor 50 may automatically (e.g., randomly) determine each time this step S9 is performed such that the whole of the workpiece W is in the position to come within the field of view of the vision sensor 14, by taking into account the positional relationship between the tool coordinate system C2 (or workpiece coordinate system C4) and the sensor coordinate system C3, which have been set at this point.

After step S9, the processor 50 returns to step S3 and repeats the loop of steps S3 to S9 until determining YES in step S7. Thus, the processor 50 can automatically acquire a plurality of pieces of teaching position data $TPD_n$ ($n=1, 2, 3, 4 \ldots$).

When determining YES in step S7, the processor 50 serves, in step S10, as the teaching position acquisition unit 88 to obtain new teaching position data $TPD_0$ (e.g., coordinates $Q_{TW\_0}$ or $Q_{WT\_0}$) based on the plurality of pieces of teaching position data $TPD_n$ acquired by the above-described method.

In step S11, the processor 50 serves as the operation program generating unit 92 to generate the operation program OP in which the teaching position data $TPD_0$ (i.e., coordinates $Q_{TW\_0}$ or $Q_{WT\_0}$) is defined, as in the above-described embodiment. As described above, according to the present embodiment, the processor 50 can automatically generate the operation program OP by automatically executing a series of operations of steps S1 to S11. With this configuration, the process of teaching the robot 12 the position to grip the workpiece W can be accelerated and simplified.

In the above-described step S9, the processor 50 may serve as the robot control unit 90 to change the position of the hand 30 instead of changing the orientation of the hand 30. Specifically, in step S9, the processor 50 may operate the mechanical part 42 of the robot 12 to change the position of the hand 30 by translationally moving the hand 30 by a predetermined distance δ in the direction of the x-axis, y-axis or z-axis of the tool coordinate system C2 (or workpiece coordinate system C4), which is set in the robot coordinate system C1 at this point. Here, "translational movement" can be defined as the operation for moving the hand 30 without changing the orientation of the hand 30 (i.e., the direction of each axis of the tool coordinate system C2).

Alternatively, the processor 50 may alternately perform an operation to change the orientation of the hand 30 and an operation to change the position of the hand 30 for performing each step S9, or alternatively, the processor 50 may change the position of the hand 30 together with the orientation of the hand 30 for performing each step S9.

In the above-described embodiment, the case in which the functions of the device 100 are implemented in the teaching device 18, is described. However, without being limited to this, the functions of the device 100 can also be implemented in the controller 16 (or vision sensor 14). In this case, the processor 70 (or a processor of the vision sensor 14) of controller 16 serves as the device 100 (i.e., the image data acquisition unit 82, the workpiece position acquisition unit 84, the hand position acquisition unit 86, the teaching position acquisition unit 88, the robot control unit 90, and the operation program generating unit 92).

Additionally, some of the image data acquisition unit 82, the workpiece position acquisition unit 84, the hand position acquisition unit 86, the teaching position acquisition unit 88, the robot control unit 90, and the operation program generating unit 92 may be implemented in one of the controller 16, the teaching device 18, and the vision sensor 14, while other units may be implemented in the other one of the controller 16, the teaching device 18, and the vision sensor 14.

For example, the image data acquisition unit 82 may be implemented in the vision sensor 14, the workpiece position acquisition unit 84, the hand position acquisition unit 86, and the robot control unit 90 may be implemented in the controller 16, and the teaching position acquisition unit 88 and the operation program generating unit 92 may be implemented in the teaching device 18. In this case, the processor of the vision sensor 14, the processor 70 of the controller 16, and the processor 50 of the teaching device 18 constitute the device 100.

In the above-described embodiment, the processor 50 may serve as the hand position acquisition unit 86, acquire data indicating the position and orientation of the hand 30 in the sensor coordinate system C3 based on the image data $ID_n$, and acquire the hand position data $HPD_n$ from the data. More specifically, as illustrated in FIG. 6, the vision sensor 14 images the image data $ID_n$ with a view of the workpiece W and the hand 30 gripping the workpiece W.

When serving as the image data acquisition unit 82 to acquire the image data $ID_n$ from the vision sensor 14, the processor 50 acquires a hand model 30M which models the hand 30, together with the above-described workpiece model WM. This hand model 30M is, for example, the three-dimensional CAD model, which is stored in advance in the memory 52.

The processor 50 analyzes the three-dimensional point cloud image of the hand 30 shown in the image data $ID_n$ using a predetermined pattern matching parameter and arranges the hand model 30M in a simulated manner to match the hand 30 shown in the image data $ID_n$. Subsequently, the processor 50 sets the tool coordinate system C2 with the positional relationship illustrated in FIG. 3 for the hand model 30M arranged in the image data $ID_n$. Subsequently, the processor 50 acquires coordinates $Q_{ST\_n}$ of the set tool coordinate system C2 in the sensor coordinate system C3 and acquires the hand position data $HPD_n$ (coordinates $Q_{RT\_n}$) by transforming the coordinates $Q_{ST\_n}$ into the robot coordinate system C1.

It is also possible to make the vision sensor 14 perform these functions. For example, by applying the workpiece model WM and the hand model 30M to the imaged image data $ID_n$, the vision sensor 14 (specifically, the processor) may acquire the coordinates $Q_{ST\_n}$ of the tool coordinate system C2 in the sensor coordinate system C3 and the coordinates $Q_{SW\_n}$ of the workpiece coordinate system C4 in the sensor coordinate system C3 and provide them to the teaching device 18.

Alternatively, the vision sensor 14 may serve as the workpiece position acquisition unit 84 to acquire the coordinates $Q_{SW\_n}$ of the workpiece coordinate system C4 in the sensor coordinate system C3 as the workpiece position data $WPD_n$ and serve as the hand position acquisition unit 86 to acquire the coordinates $Q_{ST\_n}$ of the tool coordinate system C2 in the sensor coordinate system C3 as the hand position data $HPD_n$.

Subsequently, the vision sensor 14 may serve as the teaching position acquisition unit 88 to acquire the teaching position data $TPD_n$ (e.g., coordinates $Q_{TW\_n}$ or $Q_{WT\_n}$) based on the workpiece position data $WPD_n$ (coordinates $Q_{SW\_n}$) and the hand position data $HPD_n$ (coordinates $Q_{ST\_n}$). That is, in this case, the processor of the vision sensor 14 serves as the device 100.

In the above-described embodiment, the processor 50 performs the processing PR1 to exclude for each of the plurality of coordinates $Q_{TW\_n}$ or $Q_{WT\_n}$ and subsequently performs the processing PR2 to average the coordinates $Q_{TW\_m}$ or $Q_{WT\_m}$ registered in the active coordinates group GRP. However, without being limited to this, the processor 50 may execute only one of the processing PR1 for excluding and the processing PR2 for averaging, for a plurality of coordinates $Q_{TW\_n}$ or $Q_{WT\_n}$.

For example, the processor 50 may obtain new teaching position data $TPD_0$ by executing the processing PR2 for averaging the acquired plurality of coordinates $Q_{TW\_n}$ or $Q_{WT\_n}$, without performing the processing PR1 for excluding. Alternatively, the processor 50 may only perform the processing PR1 for excluding a plurality of coordinates $Q_{TW\_n}$ or $Q_{WT\_n}$ and automatically select, in accordance with predetermined conditions, one teaching position data $TPD_0$ from among the coordinates $Q_{TW\_m}$ or $Q_{WT\_m}$ registered in the active coordinates group GRP as a result of the processing PR1.

In the above-described embodiment, the case in which the processor 50 obtains new teaching position data $TPD_0$ based on the acquired plurality of pieces of teaching position data $TPD_n$ is described. However, without being limited to this, the processor 50 may, for example, generate image data in which the acquired plurality of pieces of teaching position data $TPD_n$ are displayed in list form and display them on the display device 56.

Subsequently, the operator operates the input device 58 to give the processor 50 input data to select the desired teaching position data $TPD_0$ from among the plurality of pieces of teaching position data $TPD_n$ displayed on the display device 56. On receiving the input data, the processor 50 generates the operation program OP in which teaching position data $TPD_0$ selected by the operator is defined.

In the above-described embodiment, the case is described in which the processor 50 acquires a plurality of pieces of teaching position data $TPD_n$ by repeatedly changing the orientation of the hand 30 by serving as the robot control unit 90. However, without being limited to this, the processor 50 may acquire only the above-described teaching position data $TPD_1$ without changing the orientation of the hand 30. In this case, the processor 50 may generate the operation program OP in which the teaching position data $TPD_1$ is defined. That is, the robot control unit 90 can be omitted from the device 100 in this case.

In the above-described embodiment, the case is described in which the processor 50 serves as the operation program generating unit 92 to generate the operation program OP. However, without being limited to this, the operator may manually generate the operation program OP based on the teaching position data $TPD_n$ acquired by the processor 50. That is, in this case, the operation program generating unit 92 can be omitted from the device 100.

In the above-described embodiment, the case is described in which the processor 50 acquires the workpiece position data $WPD_n$ by applying the workpiece model WM to the image data $ID_n$. However, without being limited to this, the processor 50 can also acquire the workpiece position data $WPD_n$ by analyzing the image of the workpiece W shown in the image data $ID_n$ without using the workpiece model WM.

In the above-described embodiment, the case is described in which the teaching position data $TPD_n$ is acquired based on the robot coordinate system C1, the tool coordinate system C2, the sensor coordinate system C3, and the workpiece coordinate system C4, as the control coordinate system C. However, without being limited to this, for example, teaching position data $TPD_n$ can be acquired based on a world coordinate system C5. The world coordinate system C5 is the control coordinate system C that determines the three-dimensional space of a work cell and is fixedly set in the work cell.

Note that the vision sensor 14 may be fixed to the mechanical part 42 of the robot 12 (e.g., upper arm 26 or lower arm 24) instead of the retention frame 44. In this case, the vision sensor 14 is attached to the mechanical part 42 so that the workpiece W gripped by the hand 30 can be imaged. In the above-described embodiment, a case is described in which the workpiece position data $WPD_n$, the hand position data $HPD_n$, and the teaching position data $TPD_n$ are coordinates Q of the control coordinate system C, but without being limited to this, may be represented as any other data.

Furthermore, instead of gripping the large ring W2, the hand 30 may grip the small ring W3 by pressing the claw parts 34 and 36 against the inner wall surface of the through hole H2. In this case, the teaching device 18 teaches the position and orientation at which the hand 30 grips the small ring W3 using a method similar to the above-described embodiment.

The workpiece W is not limited to the form illustrated in FIG. 4 (connecting rod) but can be of any shape, and the hand 30 can be of any type. For example, instead of the claw parts 34 and 36 that can be opened and closed, the hand 30 may include, for example, a suction part (vacuum equipment, sucking disc, magnet, or the like) and suctions and grips the workpiece W with the suction part.

The vision sensor 14 may be a two-dimensional camera. In this case, the robot system 10 may further include a distance sensor that is fixed to the vision sensor 14 and can measure the distance d between the vision sensor 14 and the subject (workpiece W). The teaching device 18 may also be directly connected to the robot 12 (servo motor 40) or the vision sensor 14. As described above, the present disclosure is described above through the embodiment, but the above-described embodiment does not limit the invention according to the claims.

REFERENCE SIGNS LIST

10 Robot system
12 Robot
14 Vision sensor
16 Controller
18 Teaching device
30 Hand
70, 100 Processor
82 Image data acquisition unit
84 Workpiece position acquisition unit
86 Hand position acquisition unit
88 Teaching position acquisition unit
90 Robot control unit
92 Operation program generating unit

The invention claimed is:

1. A device configured to teach a position and orientation at which a robot grips a workpiece with a hand in a control coordinate system for controlling the robot, the device comprising a processor configured to:

acquire a plurality of pieces of image data obtained by repeatedly imaging the workpiece by a vision sensor arranged at a known position in the control coordinate system when the robot grips the workpiece with the hand;

respectively acquire a plurality of pieces of workpiece position data, each of which indicates a position and orientation of the workpiece in the control coordinate system when the vision sensor images one of the plurality of pieces of image data, based on the plurality of pieces of image data, when the robot grips the workpiece with the hand;

respectively acquire a plurality of pieces of hand position data, each of which indicates a position and orientation of the hand in the control coordinate system when the vision sensor images the one of the plurality of pieces of image data, when the robot grips the workpiece with the hand;

respectively acquire a plurality of pieces of teaching position data, each of which indicates a positional relationship between the hand and the workpiece in the control coordinate system when the vision sensor images the one of the plurality of pieces of image data, based on the plurality of pieces of workpiece position data and on the plurality of pieces of hand position data, the teaching position data is represented as coordinates of the control coordinate system; and obtain new teaching position data by excluding the coordinates of the teaching position data, which are outside of a predetermined allowable range, among the coordinates of the plurality of pieces of the teachings position data, wherein the robot is controlled to grip the workpiece based on the acquired teaching position data.

2. The device of claim 1, wherein the processor is further configured to operate the robot so as to repeatedly change the orientation of the hand gripping the workpiece, wherein the processor is configured to acquire a plurality of pieces of the image data imaged by the vision sensor every time the processor changes the orientation of the hand, wherein the processor is configured to acquire a plurality of pieces of the workpiece position data respectively when each of the plurality of pieces of the image data is imaged, based on each of the plurality of pieces of the image data acquired by the processor, wherein the processor is configured to acquire a plurality of pieces of the hand position data respectively when each of the plurality of pieces of the image data is imaged, and wherein the processor is configured to acquire a plurality of pieces of the teaching position data respectively when each of the plurality of pieces of the image data is imaged, based on the respective pieces of the workpiece position data acquired by the processor and on the respective pieces of the hand position data acquired by the processor.

3. The device of claim 2, wherein the processor is configured to obtain new teaching position data to be used for an operation to cause the robot to grip the workpiece with the hand, based on the plurality of pieces of the acquired teaching position data.

4. The device of claim 3, wherein the teaching position data is represented as coordinates of the control coordinate system, and wherein the processor is configured to obtain the new teaching position data by:

obtaining an average of the coordinates of the plurality of pieces of the teaching position data.

5. The device of claim 1, wherein the processor is further configured to generate an operation program in which the teaching position data is defined.

6. The device of claim 1, wherein the processor is configured to acquire, as the workpiece position data, data indicating a position and orientation in the control coordinate system of a workpiece model which models the workpiece when the workpiece model is matched to the workpiece shown in the image data.

7. The device of claim 1, wherein the control coordinate system includes:

a robot coordinate system set to the robot;

a workpiece coordinate system set to the workpiece;

a tool coordinate system set to the hand and having a known positional relationship with the robot coordinate system; and a sensor coordinate system set to the vision sensor and having a known positional relationship with the robot coordinate system, wherein the vision sensor is arranged at the known position in the robot coordinate system, wherein the workpiece position acquisition unit is configured to:

acquire first coordinates in the sensor coordinate system of the workpiece coordinate system indicating a position and orientation of the workpiece shown in the image data; and acquire, as the workpiece position data, second coordinates of the workpiece coordinate system in the robot coordinate system by transforming the first coordinates into the robot coordinate system, wherein the processor is configured to acquire, as the hand position data, third coordinates in the robot coordinate system of the tool coordinate system indicating a position and orientation of the hand, and wherein the processor is configured to acquire the teaching position data as coordinates of the workpiece coordinate system in the tool coordinate system or as coordinates of the tool coordinate system in the workpiece coordinate system, based on the second coordinates and the third coordinates.

8. A robot system comprising:

a robot including a hand configured to grip a workpiece;

a vision sensor configured to image the workpiece; and a device configured to teach a position and orientation at which the robot grips the workpiece with the hand in a control coordinate system for controlling the robot, the device comprising a processor configured to:

acquire a plurality of pieces of image data obtained by repeatedly imaging the workpiece by a vision sensor arranged at a known position in the control coordinate system when the robot grips the workpiece with the hand;

respectively acquire a plurality of pieces of workpiece position data, each of which indicates a position and orientation of the workpiece in the control coordinate system when the vision sensor images one of the plurality of pieces of image data, based on the plurality of pieces of image data, when the robot grips the workpiece with the hand;

respectively acquire a plurality of pieces of hand position data, each of which indicates a position and orientation of the hand in the control coordinate system when the vision sensor images the one of the plurality of pieces of image data, when the robot grips the workpiece with the hand;

respectively acquire a plurality of pieces of teaching position data, each of which indicates a positional relationship between the hand and the workpiece in the control coordinate system when the vision sensor images the one of the plurality of pieces of image data, based on the plurality of pieces of workpiece position data and on the plurality of pieces of hand position data, the teaching position data is represented as coordinates of the control coordinate system; and obtain new teaching position data by excluding the coordinates of the teaching position data, which are outside of a predetermined allowable range, among the coordinates of the plurality of pieces of the teaching position data, wherein the robot is controlled to grip the workpiece based on the acquired teaching position data.

9. The robot system of claim 8, comprising a controller configured to control the robot so as to grip the workpiece with the hand, based on second image data of the workpiece imaged by the vision sensor, wherein the controller is configured to:

acquire, as second workpiece position data, data indicating a position and orientation in the control coordinate system of the workpiece shown in the second image data; and determine a position and orientation of the hand in the control coordinate system when the hand grips the workpiece imaged by the vision sensor, based on the second workpiece position data and the teaching position data.

10. A method of teaching a position and orientation at which a robot grips a workpiece with a hand in a control coordinate system for controlling the robot, the method comprising:

acquiring, by a processor, a plurality of pieces of image data obtained by repeatedly imaging the workpiece by a vision sensor arranged at a known position in the control coordinate system when the robot grips the workpiece with the hand;

respectively acquiring, by the processor, a plurality of pieces of workpiece position data, each of which indicates a position and orientation of the workpiece in the control coordinate system when the vision sensor images one of the plurality of pieces of image data, based on the plurality of pieces of image data, when the robot grips the workpiece with the hand;

respectively acquiring, by the processor, a plurality of pieces of hand position data, each of which indicates a position and orientation of the hand in the control coordinate system when the vision sensor images the one of the plurality of pieces of image data, when the robot grips the workpiece with the hand;

respectively acquiring, by the processor, a plurality of pieces of teaching position data, each of which indicates a positional relationship between the hand and the workpiece in the control coordinate system when the vision sensor images the one of the plurality of pieces of image data, based on the plurality of pieces of workpiece position data and on the plurality of pieces of hand position data, the teaching position data is represented as coordinates of the control coordinate system;

obtaining new teaching position data by excluding the coordinates of the teaching position data, which are outside of a predetermined allowable range, among the coordinates of the plurality of pieces of the teaching position data; and controlling the robot to grip the workpiece based on the acquired teaching position data.

\* \* \* \* \*